(12) United States Patent
Frerking

(10) Patent No.: US 7,869,612 B1
(45) Date of Patent: Jan. 11, 2011

(54) SYSTEM AND METHOD FOR OPTIMIZING THE STRENGTH AND ORIENTATION OF THE INDUCTIVE FIELD OF A HEARING AID COMPATIBLE DEVICE

(75) Inventor: Melvin Duane Frerking, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 428 days.

(21) Appl. No.: 12/130,353

(22) Filed: May 30, 2008

Related U.S. Application Data

(62) Division of application No. 10/932,859, filed on Sep. 2, 2004, now Pat. No. 7,397,926.

(51) Int. Cl.
*H04R 25/00* (2006.01)
(52) U.S. Cl. ...................... 381/315; 381/331
(58) Field of Classification Search ............ 381/312, 381/313, 315, 324, 326, 331; 379/443; 455/95, 455/100, 351, 556.1
See application file for complete search history.

(56) References Cited

U.S. PATENT DOCUMENTS

| | | | |
|---|---|---|---|
| 3,659,056 A * | 4/1972 | Morrison et al. ............ | 381/315 |
| 5,640,457 A | 6/1997 | Gnecco | |
| 5,768,397 A | 6/1998 | Fazio | |
| 5,819,162 A | 10/1998 | Spann et al. | |
| 6,009,311 A | 12/1999 | Killion et al. | |
| 6,032,039 A | 2/2000 | Kaplan | |
| 6,181,781 B1 | 1/2001 | Porter et al. | |
| 6,307,945 B1 * | 10/2001 | Hall ........................... | 381/315 |
| 6,594,370 B1 * | 7/2003 | Anderson ................... | 381/315 |
| 6,633,645 B2 | 10/2003 | Bren et al. | |
| 6,658,126 B1 | 12/2003 | Stern | |
| 6,694,143 B1 * | 2/2004 | Beamish et al. .......... | 455/456.1 |
| 7,106,874 B2 | 9/2006 | Wieczorek et al. | |
| 2003/0152243 A1 | 8/2003 | Julstrom et al. | |

OTHER PUBLICATIONS

Chapter 3 Antenna Arrays and Beamforming, thesis, downloaded at http://scholar.lib.vt.edu/theses/available/etd-04262000-15330030/unrestricted/ch3.pdf on May 28, 2004.

(Continued)

*Primary Examiner*—Tuan D Nguyen
(74) *Attorney, Agent, or Firm*—Moazzam & Associates, LLC

(57) ABSTRACT

A system and method provides optimization of the strength and orientation of the inductive field of a hearing aid compatible ("HAC") device, relative to a telecoil in a user's hearing aid. One aspect provides control of the drive level of a transmitting telecoil contained in the HAC device. Other aspects provide steering of the inductive field of the device by using a telecoil array and controlling the amplitude or phase of the signals transmitted by each telecoil in the array to create a composite field. Another aspect provides a plurality of transmitting telecoils arranged such that each telecoil has a different orientation, and a plurality of switches for controlling which transmitting telecoil is active. The user may then select the telecoil having a preferred orientation. Another aspect allows a transmitting telecoil to be physically oriented to an optimal position by embedding the telecoil in a substantially spherical element.

10 Claims, 22 Drawing Sheets

OTHER PUBLICATIONS

Dave Baron, Understanding Probe Selection to Speed EMC Tests, reprint from the Mar. 2002 issue of Conformity, vol. 7, No. 3, downloaded at http://www.ets-lindgren.com/manuals/probeselection%20reprint_lo.pdf on May 28, 2004.

Federal Communications Commision; Report and Order, Adopted Jul. 10, 2003, pp. 1-57.

MX.Com, Inc., MX 609 An Audio Delay circuit based on the MX609 CVSD Codec, data bulletin, 1998, pp. 1-2, Winston-Salem, NC.

Micronas GMBH, MAD 4868A Micronas Audio Delay IC, product information sheet, Feb. 2004,pp. 1-2, Germany.

Audex Assistive Listening Systems, The Champ Audex Cellular Program for People With Hearing Loss, product information web page, downloaded at http://www.audex.com/champ.html on Mar. 1, 2004.

Federal Communications Commission Consumer & Governmental Affairs Bureau, Hearing Aid compatibility Compliance for Telephone Equipment, fact sheet, Jun. 16, 2002, pp. 1-2, downloaded at http;//www.fccc.gov/cgb/consumerfacts/hac.html on Feb. 26, 2004.

Self Help for Hard of Hearing People, An Analysis of Inductive Coupling and Interference Issues in Digital Wireless Phones: Technically Feasible Solutions, information paper, last updated Feb. 5, 2004, downloaded at http://hearingloss.org/html/accdigwire752a.html on Mar. 1, 200.

Federal Communications Commission Consumer & Governmental Affairs Bureau, FCC Acts to Promote Accessibility of Digital Wireless Phones to Individuals with hearing Disabilities, FCC Consumer Advisory, last updated Oct. 6, 2003, downloaded at http://www.fcc.gov/cgb/consumerfacts/accessiblewireless.html on Jan. 28, 2004.

* cited by examiner

FIG. 21A
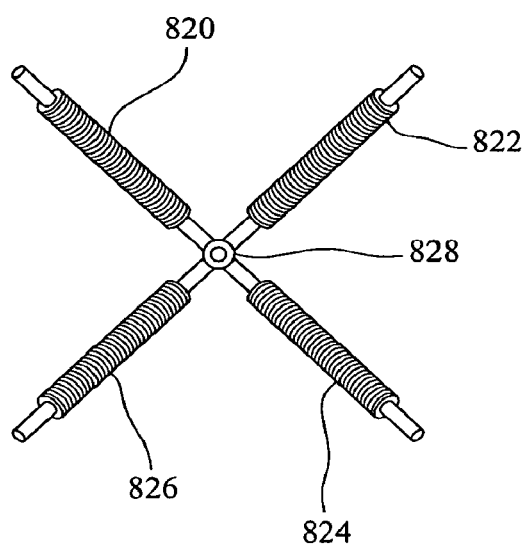
FIG. 21B
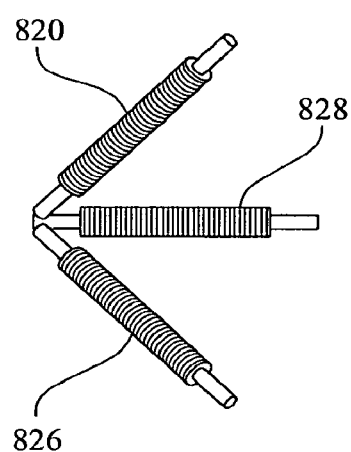
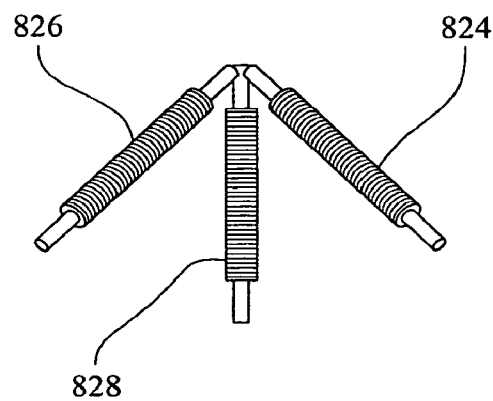
FIG. 21C

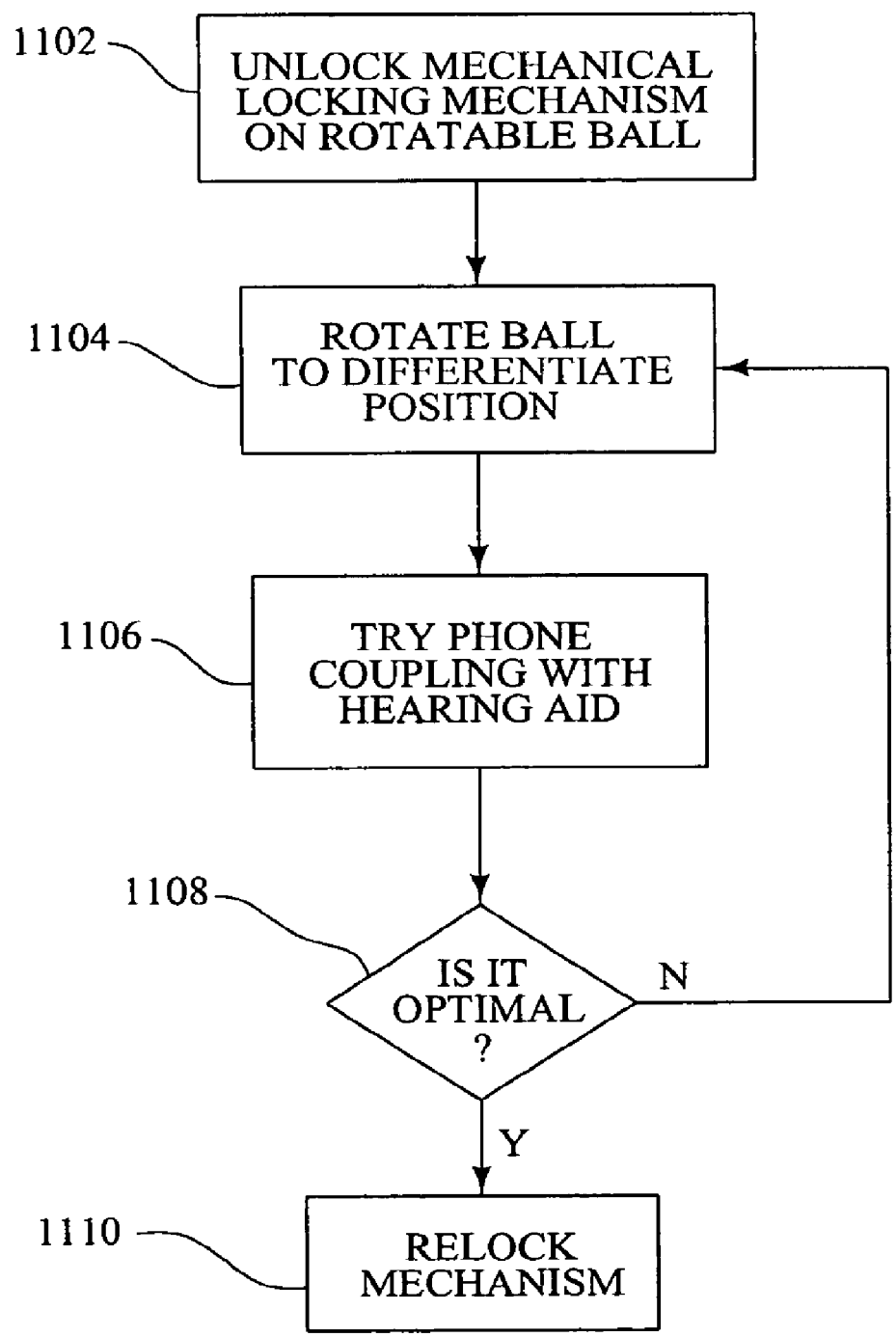

SYSTEM AND METHOD FOR OPTIMIZING THE STRENGTH AND ORIENTATION OF THE INDUCTIVE FIELD OF A HEARING AID COMPATIBLE DEVICE

CROSS-REFERENCE TO RELATED APPLICATIONS

This application is a divisional of pending U.S. patent application Ser. No. 10/932,859, filed Sep. 2, 2004, which is hereby incorporated by reference in its entirety for all purposes.

BACKGROUND OF THE INVENTION

A. Field of Invention

This invention relates to hearing aid compatible devices providing inductive coupling of an audio signal to a hearing aid having a telecoil. More particularly, the invention relates to systems and methods for optimizing the strength and orientation of the inductive field of a hearing aid compatible device.

B. Background and Description of Related Art

Hearing aids typically use a small microphone and amplifier to pick up sound and amplify it for persons with hearing related disabilities. However, this arrangement can cause feedback when a telephone's earpiece is placed up to the wearer's ear. Additionally, the presence of background noise affects the speech comprehension of people with partial hearing much more adversely than that of people with normal hearing. People with partial hearing thus require a high signal-to-noise ratio to optimize their speech discrimination.

A hearing aid telecoil is a small, tightly wrapped piece of wire that, when activated, picks up the voice signal from an inductive field that is emitted from hearing aid compatible (HAC) devices, such as telephones. Such inductive fields may be generated by voice-coil type speakers, or transmitting telecoils contained in the device. Thus, telecoil-equipped hearing aids are able to bypass background noise, and prevent the phenomenon of feedback.

However, nearby electromagnetic interference (EMI) may also be picked up by the telecoil, creating interference with the desired voice signal. For example, power transformers, fluorescent lighting, trains and the operation of digital wireless telephones can cause EMI that can be picked up by telecoils.

For example, with respect to digital wireless phones, the EMI may be caused by several sources. One such source is the actual digital radio frequency (RF) transmission of the communication signal. This pulsing signal appears to induce continually varying current in the small wires of the hearing aid. Another source of EMI is extraneous radiation from the wireless phone's battery, components and wiring. For instance, in a time-sharing, multiplex network, such as a TDMA or GSM network, the RF transmitter of the phone turns on and off at the rate of multiplexing, which typically falls in the audio range. The heavy current drawn by the RF transmitter causes any conductors supplying current to the transmitter to radiate this inductive EMI. Additionally, many other components of the phone, such as the backlight for the display, the display itself, and the keypad, utilize strobing techniques that generate EMI.

One potential solution to overcoming the EMI is to boost the desired inductive signal of the HAC device to a level that overpowers the EMI. If the inductive field of the device is strong, the telecoil can be used with relatively low amplification of the received signal and, thus, relatively low amplification of any EMI. However, If the inductive field is comparatively weak, the amplification of the signal, and, thus, any EMI, needs to be increased to obtain an adequate signal. Further complicating the problem, varying amounts of EMI may be present in the environment, such that the inductive signal level required to overcome the EMI cannot be predetermined.

Still further, the generation of the boosted inductive signal creates a power drain on HAG device that is proportional to the level of the boosted signal. This power drain will shorten the operating time of HAG devices having a "power budget", such as battery powered wireless telephones. Thus, generating a larger signal will significantly reduce the length of time that the HAG device can operate, whereas a weaker signal may be adequate to overcome the EMI.

Thus, there is a need for a system and method for optimizing the strength of the inductive field of a hearing aid compatible device that is strong enough to overpower ambient EMI, yet having minimal power drain on the device's battery.

Additionally, certain classes of hearing aids have an issue with reorientation, or shifting, of the telecoil during the manufacturing process. More specifically, ITC (In The Canal) and CIC (Completely In the Canal) hearing aid classes are manufactured using techniques allowing most or all of the hearing aid electronics to be molded into a unit that fits into the ear canal. However, in doing so the telecoil can wind up in virtually any position. Optimal coupling of the inductive signal into the telecoil occurs when the signal field is parallel to the telecoil. Thus, the user may have to twist the HAC device around until a "sweet spot" is found, often resulting in a position of the device that is not optimal for its operation.

Thus, there is also need for a system and method for optimizing the orientation of the inductive field of a hearing aid compatible device for coupling the inductive signal into the telecoil.

SUMMARY OF THE INVENTION

The system and method of the present invention solves these needs, and others, by optimizing the strength and orientation of the inductive field of a hearing aid compatible device for efficient and effective coupling of the field with a hearing aid having a telecoil.

The invention is for a telecoil management system to optimize the inductive field strength for the user's preference and environmental conditions. The management system could be part of the hardware and software of a wireless telephone, for example. The drive level to the telecoil will be controlled by a drive level control circuit and user interface. This will allow the user to set the level of magnetic coupling at a level needed to match their specific needs, If the device is battery powered, the power that would have been expended on unneeded inductive field strength can then be used to extend the operating time of the device.

The invention also includes a means for electronic or mechanical reorientation of the magnetic field from the phone to allow a hearing aid user to select the optimal orientation to match the orientation of a telecoil contained in the hearing aid. This will improve the user satisfaction experience. The ability to reorient the device's inductive field could be accomplished via the following means: by controlling the amplitude or phase of signals to each of several telecoils to create a steerable composite field, by selection of one of several coils arranged such that each telecoil has a different orientation, or by physical orientation of a transmitting telecoil to the desired orientation.

According to one aspect of the invention, a system for optimizing the drive level of the inductive signal of a hearing aid compatible device includes a user input device for signaling a change in the drive level of the inductive signal, and a control device that is in communication with the user input device. In operation, the control device receives drive level signaling from the user input device, and processes the drive level signaling to produce a gain signal and field strength information. The system also includes a display device for displaying the field strength information so as to provide a user with a visual indication of the drive level of the inductive signal and to thereby assist the user in selecting a desired drive level optimized for the user's preference. The display device is in communication with the control device. Still further, the system has an amplifier device that is in communication with the control device. In operation, the amplifier device receives an audio signal, and amplifies the audio signal based on the gain signal. Lastly, the system has a transmitting telecoil for transmitting the amplified audio signal as an inductive signal. The transmitting telecoil is in communication with the amplifier device. Thus, the system transmits an inductive signal optimized for the user's preference.

The system may also have a speaker and a switch, where the switch is positioned between the amplifier device and the telecoil input to allow the switching of the amplified audio signal to either the telecoil or the speaker. The switch may also allow switching of the amplified audio signal to both the telecoil and the speaker.

The user input device may have an increase input, a decrease input, and a signal output. In operation, the user input device then converts a request for a change in the drive level of the inductive signal from the increase input or the decrease input into increase signaling or decrease signaling, respectively, at the signal output. The user input device could be, for example, a keypad on a wireless phone, where the increase input is an up button and the decrease input is a down button.

The control device could have a microprocessor for performing the operations described.

According to another aspect of the invention, a system for optimizing the orientation of the inductive field of a hearing aid compatible device includes a user input device for signaling a change in the orientation of the inductive field, and a control device that is in communication with the user input. In operation, the control device of this aspect receives orientation signaling from the user input, and processes the orientation signaling to produce a first gain signal, a second gain signal, and field orientation information. This system also has a display device for displaying the field orientation information so as to provide a user with a visual indication of the orientation corresponding to the orientation signaling and to thereby assist the user in selecting orientation signaling producing a desired orientation. The display device is in communication with the control device. This system further has a first amplifier and a second amplifier, with each amplifier being in communication with the control device. In operation, each amplifier receives an audio signal and amplifies the audio signal based on the first gain signal and the second gain signal, respectively, to produce a first amplified audio signal and a second amplified audio signal, respectively. The system further has a first transmitting telecoil for transmitting the first amplified audio signal and a second transmitting telecoil for transmitting the second amplified audio signal. The telecoils are in communication with the respective amplifiers, and the second telecoil is positioned substantially orthogonal to the first telecoil. The system produces a composite field having an orientation determined by the amplified audio signal transmitted by each of the telecoils.

The system of this aspect of the invention may also have a third amplifier in communication with the control device, and a third transmitting telecoil in communication with the third amplifier, with the third telecoil positioned substantially orthogonal to both the first and second telecoils. In operation, the control device further processes the orientation signaling to produce a third gain signal. The third amplifier receives the audio signal and amplifies it based on the third gain signal to produce a third amplified audio signal. Then, the third telecoil transmits the third amplified audio signal, which produces a composite signal along with the signals transmitted by the first and second telecoils. The resulting composite signal is steerable in three dimensions.

In one configuration of the system, each of the telecoils has an end in close proximity to a common end of each of the other telecoils. In another configuration, each of the telecoils has its middle section in proximity to the middle section of each of the other telecoils.

The system of this aspect of the invention may further have a fourth amplifier in communication with the control device. In this configuration, the control device is further operative to receive overall drive level signaling from the user input, and process the overall drive level signaling into an overall gain signal. The fourth amplifier can then receive an audio source signal, and amplify the audio source signal based on the overall gain control signal to produce the audio signal received by the first, second and third amplifiers.

More specifically, the user input device may have a joystick device having activation contacts and a signal output, where the activation contacts are operative to indicate up/down and left/right user input signaling. The joystick device may thus operate to apply the user input signaling at the signal output.

Again, the control device of the system may have a microprocessor. The display device may have an LCD screen.

Using this system, one method of orientation control signaling includes receiving separate increase/decrease signaling for each telecoil. Using this method, the processing of the orientation signaling may include the steps of: determining if the orientation signaling is for the first, second or third telecoil; determining if the orientation signaling is for an increase or decrease in the selected telecoil; and increasing or decreasing the gain signal for the selected telecoil.

Another method of orientation control signaling includes receiving signaling to steer the composite field left/right or up/down. Using this method, the processing of the orientation signaling may include the steps of: determining if the orientation signaling is for left/right control or up/down control; if the orientation signaling is for left/right control, determining if the orientation signaling is for left or right control, and increasing or decreasing the gain signal for the selected telecoil; and if the orientation signaling is for up/down control, determining if the orientation signaling is for up or down control, and increasing or decreasing the gain signal for the selected telecoil.

According to yet another aspect of the invention, a system for optimizing the orientation of the inductive field of a hearing aid compatible device includes: a user input device for signaling a change in the orientation of said inductive field; a control device being in communication with said user input; a display device in communication with the control device; a first phase control device and a second phase control device also being in communication with the control device, and first and second transmitting telecoils in communication with the corresponding phase control devices. The second transmitting telecoil is positioned substantially orthogonal to, and spatially separated from the first telecoil. In operation, the control device of this system receives orientation signaling from the user input, and processes the orientation signaling to produce a first phase signal, a second phase signal, and field orientation information. The display device displays the field orientation information, for the reasons described in the earlier aspects of the invention. Each of the phase control devices receives an audio signal and controls the phase of the audio signal based on the first phase signal and the second phase signal, respectively, to produce a first phase-shifted audio signal and a second phase-shifted audio signal. The first transmitting telecoil transmits the first phase-shifted audio signal and the second transmitting telecoil transmits the second phase-shifted audio signal, to thereby produce a composite field having an orientation determined by the phase-shifted audio signal transmitted by each of the telecoils.

The system of this aspect of the invention may also have a third phase control device in communication with the control device, and a third transmitting telecoil in communication with the third amplifier, with the third telecoil positioned substantially orthogonal to both the first and second telecoils. In operation, the control device further processes the orientation signaling to produce a third phase signal. The third phase control device receives the audio signal and controls the phase of the signal based on the third phase signal to produce a third phase-shifted audio signal. Then, the third transmitting telecoil transmits the third phase-shifted audio signal, which produces a composite signal along with the signals transmitted by the first and second telecoils. Again, the resultant composite signal is steerable in three dimensions.

The user input device could have a joystick device with activation contacts and a signal output, as described above. The joystick device may then operate to apply user input signaling at the signal output.

Other possible details of this system include use of a microprocessor as the control device, or a part thereof, and use of an LCD screen in the display device.

According to still yet another aspect of the invention, a system for optimizing the orientation of the inductive field of a hearing aid compatible device includes a plurality of transmitting telecoils arranged such that each telecoil has a different orientation, and a plurality of switches. Each of the switches has an audio signal input and a switch signal output. Additionally, each switch signal output is operatively connected to a different transmitting telecoil, such that switching the audio signal to a different telecoil will produce an inductive field having a different orientation. In operation, each switch receives an audio signal at the audio signal input, and switches the audio signal to the corresponding switch signal output based on the user's selection of a telecoil having an optimum orientation. Thus, the orientation of the inductive field may be optimized by selecting the transmitting telecoil that best matches the orientation of a telecoil contained in a user's hearing aid.

The system could further include: a user input device for signaling a change in the orientation of the inductive field; a control device in communication with the user input device, and a display device in communication with the control device. Additionally, each switch could also have a switch control input that is in communication with the control device. In operation, the control device would receive orientation signaling from the user input device, and process the orientation signaling to produce a switch control signal and telecoil selection information. The display device would display the telecoil selection information so as to provide a user with a visual indication of the orientation corresponding to the orientation signaling and to thereby assist the user in selecting orientation signaling producing a desired orientation. Each switch would receive the switch control signal and switches the audio signal based on the switch control signal.

Other possible details of this system could include: use of a joystick with the user input device; use of a microprocessor as the control device, or a part thereof; and use of an LCD screen in the display device.

According to even a further aspect of the invention, another system for optimizing the orientation of the inductive field of a hearing aid compatible device includes a substantially spherical element including, embedded therein, an inductive field producing telecoil operatively connected to an audio signal source, and a semi-spherical enclosure. The substantially spherical element is received partially in the semi-spherical enclosure and is rotatable with respect to the semi-spherical enclosure so as to vary coupling between the telecoil and a hearing aid to thereby enable optimizing of the orientation of the inductive field of the telecoil. The substantially spherical element may be a ball.

Additionally, the system of this aspect could further include a retaining ring, where the retaining ring engages the semi-spherical enclosure to prevent the ball from falling from the semi-spherical enclosure. The retaining ring could have an edge and at least one tab positioned on the edge, and the semi-spherical enclosure could have at least one slot for receiving the retaining ring tab. Thus, the retaining ring could engage the semi-spherical enclosure by placing the retaining ring in the semi-spherical enclosure and rotating the ring.

In one configuration, the system could have flexible leads extending between the telecoil and the audio signal source. In this configuration, the ball could further have tabs positioned to prevent rotation of the ball to less than 180 degrees.

In another configuration, the ball further could have a pair of slide contacts connected to the telecoil. The semi-spherical enclosure could then have a pair of movable contact strips and a pair of stationary contact strips. The movable contact strips could then be in contact with the slide contacts, the stationary contact strips could be in contact with the movable contact strips, and the stationary contact strips could be in communication with the audio signal source, such that the ball could rotate with respect to the semi-spherical enclosure while maintaining continuous contact between the telecoil and the audio signal source.

Further, the system of this aspect of the invention could have a locking device to allow the substantially spherical element to be secured in a fixed position.

Thus, a method for providing optimized orientation of the inductive field of a hearing aid compatible device relative to a hearing aid using such a system could include the following steps: (i) orienting the rotatable ball containing the transmitting telecoil in a selected orientation; (ii) coupling the inductive field of the transmitting telecoil to a hearing aid; (iii) determining if the orientation of the rotatable ball produces optimal coupling between the telecoil and the hearing aid; and (iv) if the coupling produced is not optimal, repeating step (i) to provide a new orientation and repeating steps (ii) and (iii).

The method of this aspect of the invention could further include the steps of: unlocking a locking device on the rotatable ball prior to step (I); and when coupling is optimal, relocking the locking device on the rotatable ball in order to maintain the optimal orientation of the telecoil and its corresponding inductive field.

Thus, the various aspects of the invention provide optimization of the strength and orientation of the inductive field of a hearing aid compatible device. However, the invention is not limited to the preceding summary and will be better understood by reference to the following detailed description and the appended drawings and claims.

BRIEF DESCRIPTION OF THE DRAWINGS

FIG. 21A is a front view of a telecoil array for the alternate system of FIG. 20.

FIG. 21B is a side view of the telecoil array of FIG. 21A.

FIG. 21C is a bottom view of the telecoil array of FIG. 21A.

FIG. 34 is a flow diagram of a method utilizing the system of FIG. 27.

DETAILED DESCRIPTION OF EXEMPLARY EMBODIMENTS

Drive Level Optimization

Figure 1:
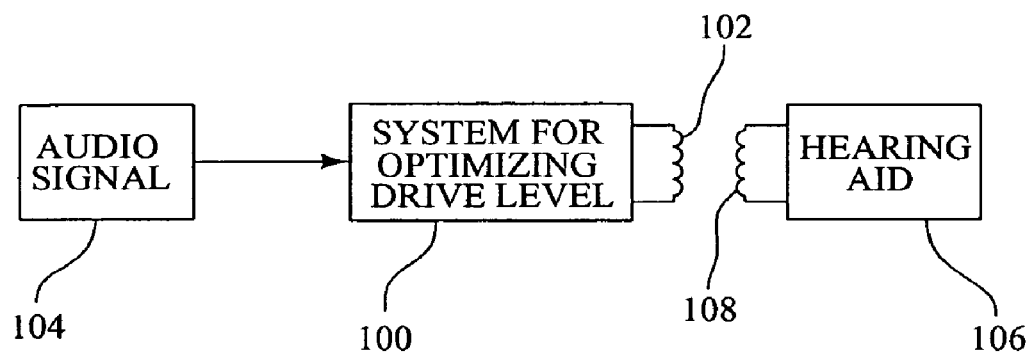
FIG. 1 is a block diagram of the environment of a system for optimizing the drive level of the inductive signal of a hearing aid compatible device.

As shown in FIG. 1, an exemplary system 100 for optimizing the drive level of the inductive signal of a hearing aid compatible (HAC) device works in conjunction with a transmitting telecoil 102 to transform an audio 104 signal into an inductive signal for transmission to a hearing aid equipped 106 with a receiving telecoil 108.

Figure 2:
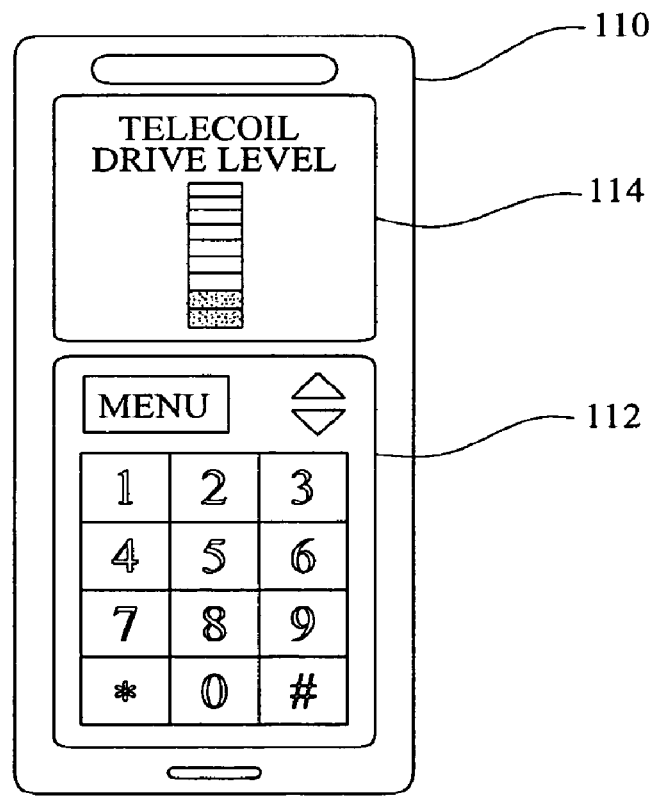
FIG. 2 is a view of a representative hearing aid compatible device incorporating such a system.

FIG. 2 shows such an exemplary system as might be incorporated into a HAC device 110 such as a wireless telephone. Other HAC devices that might utilize this system include wireline phones, cordless phones, and personal entertainment devices such as radios, stereos, CD players, MP3 players, etc. Such a HAC device may have a user input device 112, such as a keypad having an up button and a down button, and a display device 114, such as an LCD display. In operation, the user might access the system through a menu system in the phone with the assistance of a menu button. Upon calling up the system, the display device 114 may present a graphical representation of the current drive level of the system. The user may then use the user input device 112 to signal either an increase or decrease in the drive level. The system will then display the revised drive level on the display device 114.

Figure 3:
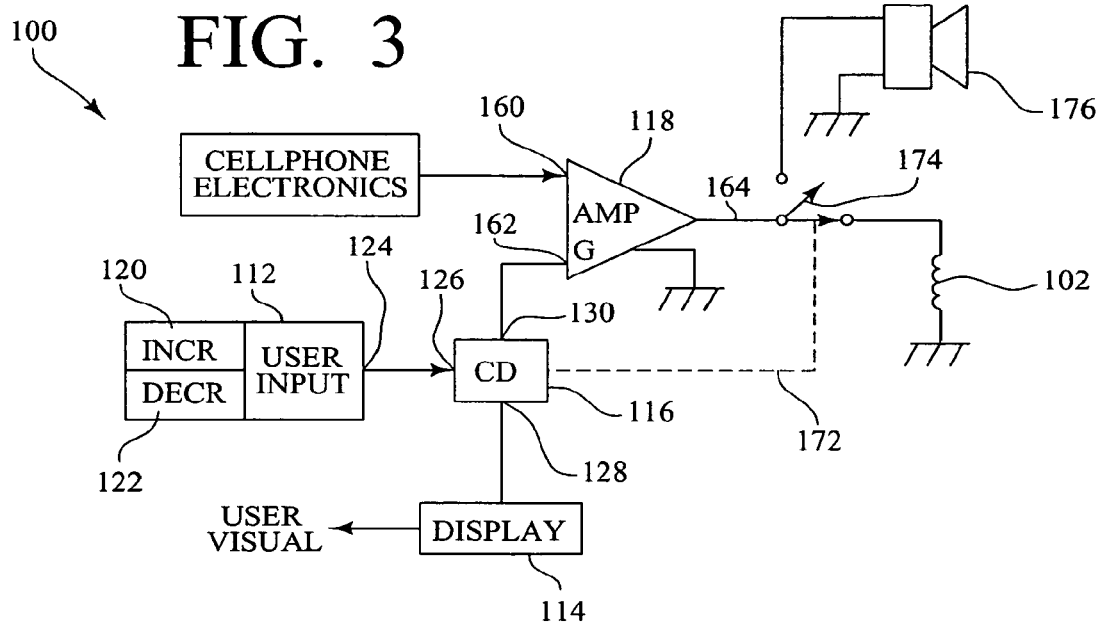
FIG. 3 is a diagram of such a system.

As shown in greater detail in FIG. 3, an exemplary system 100 for optimizing the drive level of the inductive signal of a hearing aid compatible (HAC) device includes: a user input device 112; a control device 116; a display device 114; an amplifier device 118; and a transmitting telecoil 102.

The user input device 112 is used to signal a request for a change in the drive level of the inductive signal of the hearing aid compatible device. Therefore, the user input device 112 typically has at least an increase input 120, a decrease input 122, and a signal output 124. The increase input 120 and decrease input 122 could be, for example, buttons on a wireless phone labeled "up" and "down" or otherwise. The user indicates a desire to increase the drive level of the HAC device by activating the increase input 120. If additional increases to even higher drive levels are desired, the user may repeat activation of the increase input a number of times, or just hold the increase input in an activated position, until the desired drive level is reached. Likewise, the user may indicate a desire to decrease the drive level of the HAC device by activating the decrease input 122 in a like manner to operation of the increase input.

The user input device 112 is operative to convert the user inputs into increase or decrease signaling at the signal output 124.

The control device 116, such as a microprocessor, refers generically to an electronic circuit which performs arithmetic, logic and control operations with the assistance of internal memory. The control device 116 has a user input interface 126, a display device interface 128, and a gain signal output 130. The control device 116 is in communication with the user input device 112 through the user input interface 126. In use, the control device 116 is operative to receive drive level signaling from the user input device 112 indicating the user's desire to either increase or decrease the drive level of the inductive signal of the HAC device. The control device 116 then processes the drive level signaling into a gain signal and outputs the gain signal at the gain signal output 130. Additionally, the control device 116 also processes the gain signal into field strength information and outputs the field strength information at the display device interface 128.

The display device 114 is in communication with the control device 116 through the display device interface 128. The display device 114 provides a graphic representation of the field strength information received from the control device 116, which the user can use as an aid in setting the drive level of the system.

The amplifier device 118 can be an amplifier having an audio signal input 160, a gain control input 162 and an audio signal output 164. The amplifier device 118 will then amplify an audio signal present at the audio signal input 160 by an amount determined by a gain signal present at the gain control input 162. The gain control input 162 is in communication with the control device gain signal output 130. In use, the amplifier device 118 is operative to receive an audio signal at the audio signal input 160, receive a gain signal from the control device at the gain control input 162, amplify the audio signal based on the gain signal, and output the amplified signal at the audio signal output 164.

The audio signal output 164 may contain a switch 174, either manual or electronic in nature, to allow the switching of the amplified audio signal to either, or both, inductive or speaker mode of operation. Such switch 174 via control lead 172 may be under control of control device 116 which further receives user input from user input device 112 and displays said status on display device 114. Such switch 174 would couple the output of amplifier 118 to a speaker 176 and/or the telecoil 102. Alternatively, separate amplifiers may be utilized for the acoustic and inductive output modes of operation each being optimized for its specific mode. In this implementation, a similar switch would be utilized to selectively switch the input signals to either or both of the dedicated amplifiers.

It should be noted that the user input device 112, control device 116, display device 114, amplifier device 118, and speaker 176 may already be existing items contained within the HAC device, such as are found in wireless phones.

Figure 4:
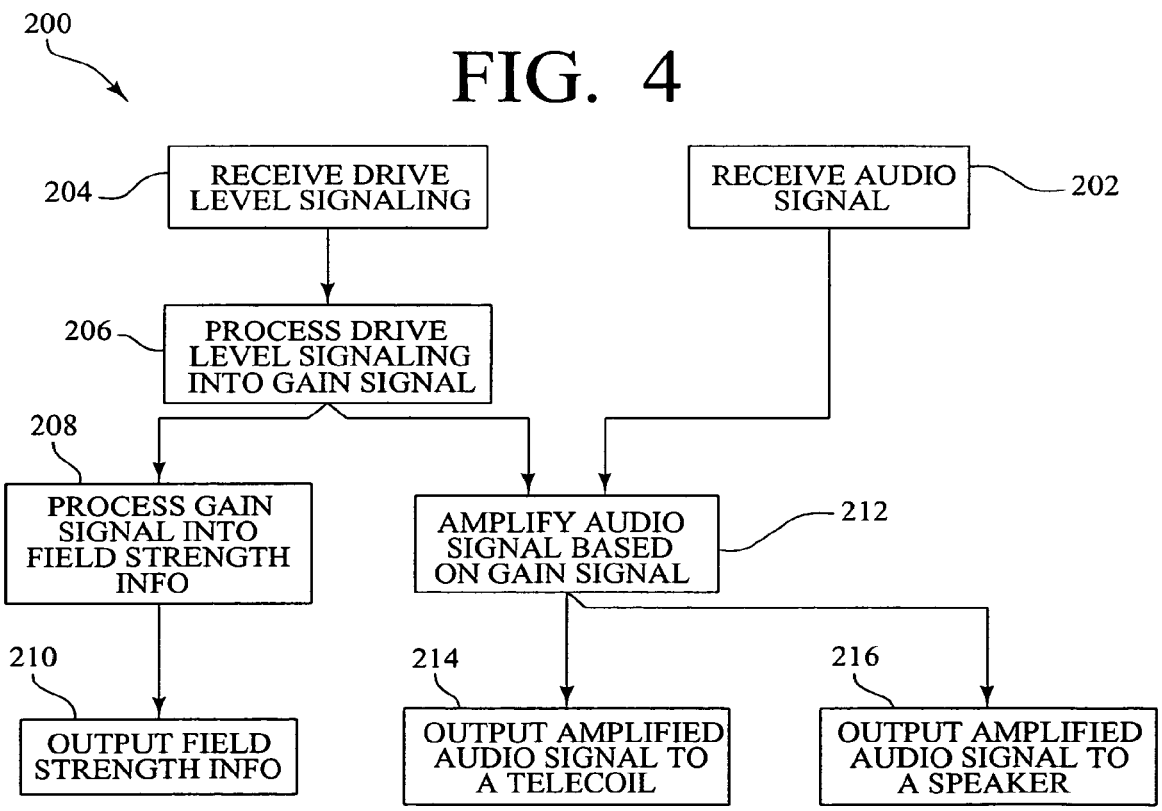
FIG. 4 is a flow diagram of a method utilizing such a system.

As shown in FIG. 4, a method 200 of optimizing the drive level of the inductive signal of a hearing aid compatible device includes the steps of: 202 receiving an audio signal at an audio signal input; 204 receiving drive level signaling from a user input device; 206 processing the drive level signaling into a gain signal; 208 processing said gain signal into field strength information; 210 outputting said field strength information to a display device; 212 amplifying said audio signal based on said gain signal; and 214 outputting said amplified audio signal to a transmitting telecoil. Additionally, the method 200 could further include the step of 216 outputting said amplified audio signal to a speaker.

B. Inductive Field Orientation Optimization

If the telecoil in the hearing aid is aligned in space so that its magnetic axis is parallel to the magnetic axis of a transmitting telecoil and the distance between them is minimized, the maximum transfer of energy will occur. Even if the space between the telecoils is maintained and the orientation between them is changed, the coupling of energy will diminish until there will be no coupling of energy when the magnetic axis of the telecoils are at right angles to each other. Thus, these exemplary embodiments provide structure and techniques to allow user re-orientation of the magnetic axis of the telecoil or telecoils in the HAC device to be more parallel to the magnetic axis of the hearing aid telecoil.

Figure 5:
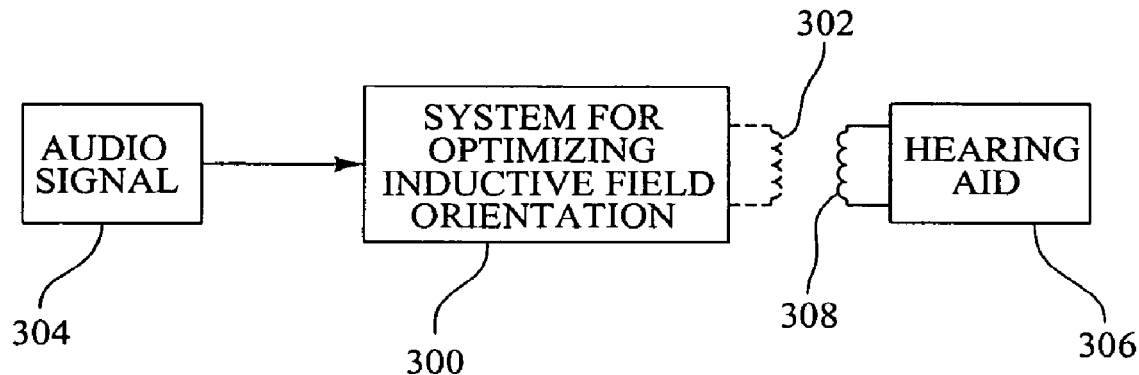
FIG. 5 is a block diagram of the environment of a system of optimizing the orientation of the inductive field of a hearing aid compatible device.

Thus, as shown in FIG. 5, an exemplary system 300 for optimizing the orientation of the inductive field of a HAC device transforms an audio signal 304 into an inductive signal for transmission over a "transmitting telecoil" 302 aligned with a receiving telecoil 308 of a hearing aid 306. As explained below, the "transmitting telecoil" 302 may be either: 1) an actual telecoil either selected or physically manipulated to have the desired orientation; or 2) an arrangement of multiple telecoils creating a resultant field or virtual telecoil having the desired orientation. Thus, optimizing the orientation of the inductive field of a HAC device produces effective and efficient coupling between the "transmitting telecoil" 302 and the receiving telecoil 308. This allows the user to use the HAC device without having to twist it around until a "sweet spot" is found. Additionally, optimizing the orientation of the inductive field of the HAC device allows the drive level of the resultant signal to also be optimized.

1. 3-D Orthogonal Telecoil Array

Amplitude Steering

Figure 13:
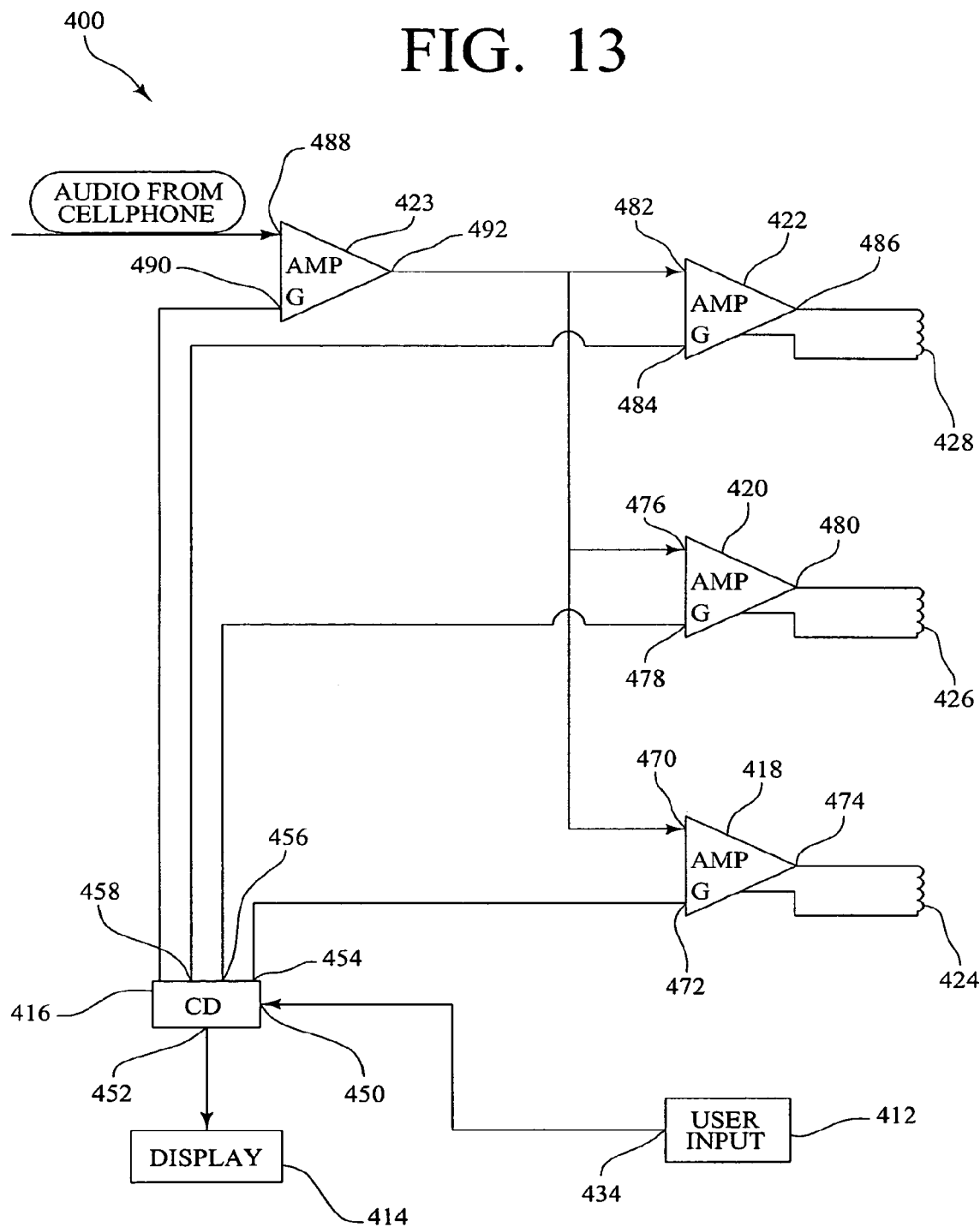
FIG. 13 is a diagram of a system for optimizing the orientation of the inductive field of a hearing aid compatible device.

One embodiment of such an exemplary system 400, shown in FIG. 13, involves arranging a number of telecoils in a 3-D orthogonal array, and steering the resultant inductive field by varying the amplitude of the signal to each telecoil to create a composite inductive field having the desired orientation and magnitude.

Figure 6:
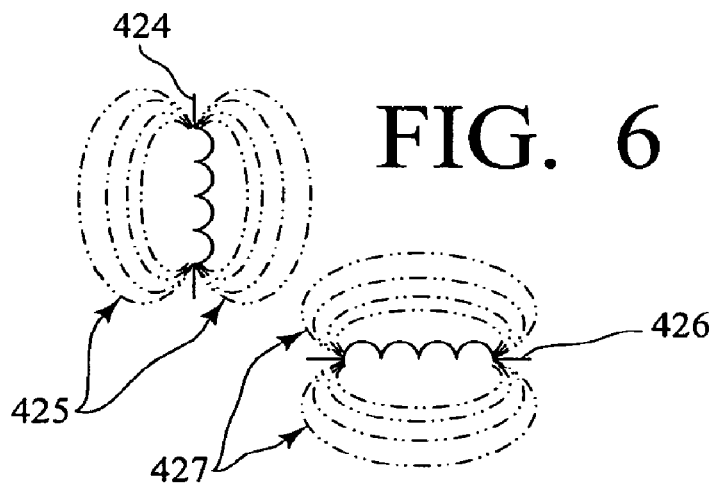
FIG. 6 is a diagram of two transmitting telecoils having separate inductive fields.
Figure 7:
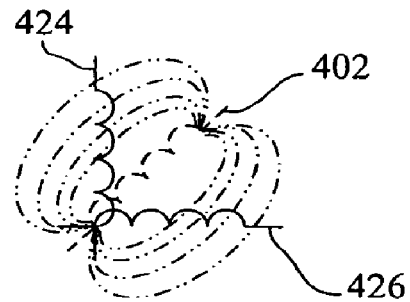
FIG. 7 is a diagram of two transmitting telecoils having a composite inductive field.

FIG. 6 shows a first transmitting telecoil 424 and a second transmitting telecoil 426 spaced from and positioned substantially orthogonal to the first telecoil. Each telecoil creates its own separate inductive field, as shown by the illustrative flux lines 425, 427. The inductive field generated by each telecoil is substantially parallel to the longitudinal axis of the telecoil, except at the ends of the telecoil where the flux lines curve inward to meet each other. If the telecoils are separated by an adequate distance, the inductive fields will exist relatively independent from each other. However, as shown in FIG. 7, if the telecoils 424, 426 are placed in closer proximity while still being substantially orthogonal to each other, the inductive fields will merge into a composite field, having flux lines substantially parallel to a virtual axis of a virtual telecoil 402. In the example shown, equal signals are sent to both telecoils, resulting in a composite signal having a virtual axis substantially 45 degrees from each of the transmitting telecoils. By varying the signal strength between the telecoils, the virtual axis of the composite signal can be repositioned or steered in the plane of the telecoils. Thus, FIG. 7 shows an exemplary embodiment of a 2-D telecoil array having a first transmitting telecoil 424 and a second transmitting telecoil 426.

Figure 8A:
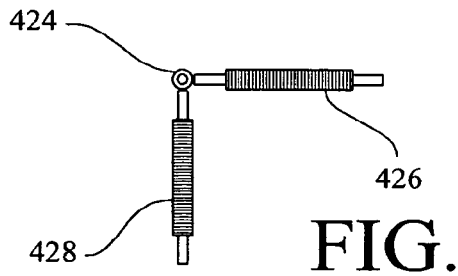
FIG. 8A is a top view of a three-dimensional substantially orthogonal telecoil array.
Figure 8B:
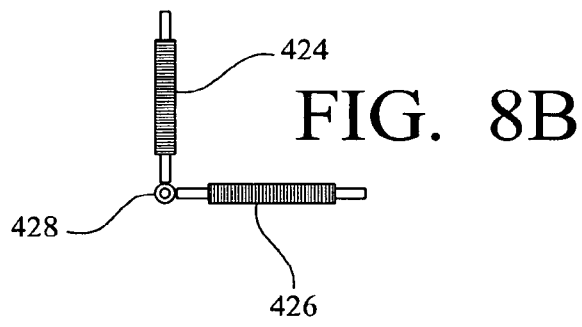
FIG. 8B is a front view of the telecoil array of FIG. 8A.
Figure 8C:
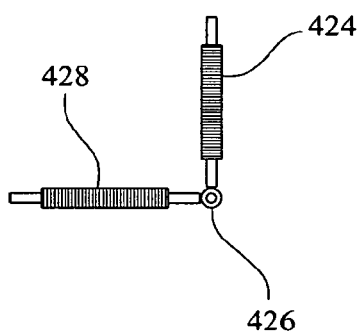
FIG. 8C is a side view of the telecoil array of FIG. 8A.

FIGS. 8A, 8B and 8C show an exemplary embodiment of a 3-D telecoil array having a first transmitting telecoil 424, a second transmitting telecoil 426, and a third transmitting telecoil 428, where the second telecoil 426 is positioned substantially orthogonal to the first telecoil 424 and where the third telecoil 428 is positioned substantially orthogonal to both the first telecoil 424 and the second telecoil 426. Additionally, FIGS. 8A, 8B and 8C show each of the telecoils having an end in close proximity to a common end of each of the other telecoils, thus forming a substantially orthogonal telecoil array in three dimensions. The addition of the third telecoil 428 to the array allows steering of the virtual axis of the composite signal in three dimensions around the array by varying the signal strength between the telecoils. It should be noted that the telecoil array shown in FIGS. 8A, 8B and 8C could be reoriented such that the telecoils meet at a point either toward the user or away from the user.

Figure 9A:
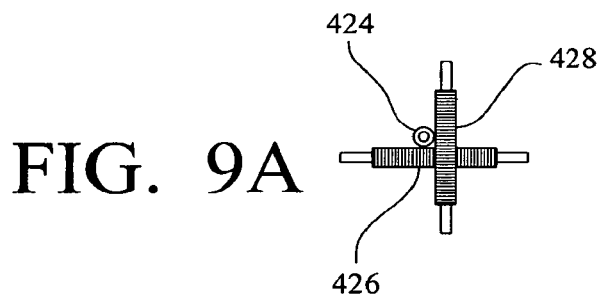
FIG. 9A is a top view of a different three-dimensional substantially orthogonal telecoil array.
Figure 9B:
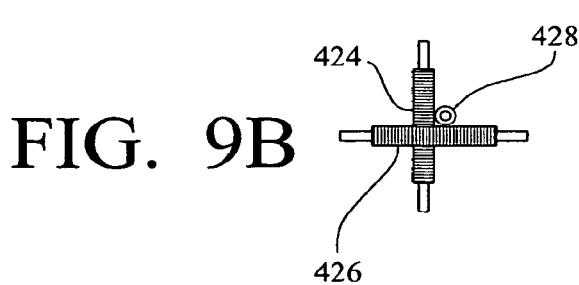
FIG. 9B is a front view of the telecoil array of FIG. 9A.
Figure 9C:
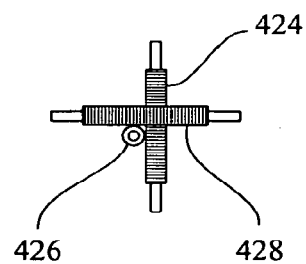
FIG. 9C is a side view of the telecoil array of FIG. 9A.

An alternate arrangement of a 3-D orthogonal telecoil array is shown in FIGS. 9A, 9B and 9C, where the telecoils 424, 426, 428 are positioned with their middle sections in proximity, creating a similar steerable composite signal.

Figure 10:
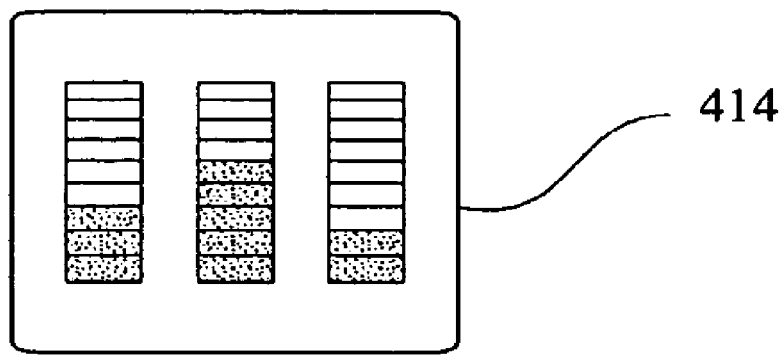
FIG. 10 is a view of a display device showing a graphical representation of the gain signals for three telecoils.
Figure 11:
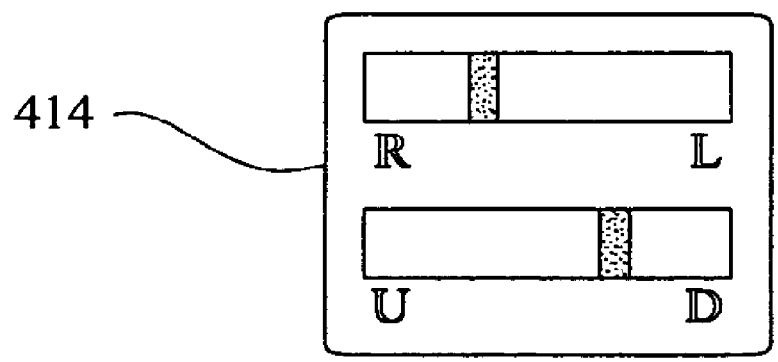
FIG. 11 is a view of an alternate display device showing a graphical representation of the relative field strength of a telecoil array.

FIG. 10 shows a display device 414 showing a potential display that a user might utilize in conjunction with a 3-D orthogonal telecoil array, as described, in order to steer the resultant composite signal. In FIG. 10, each vertical bar represents the signal strength applied to a separate telecoil. Alternately, FIG. 11 shows another potential display device 414 showing a display where the horizontal bars represent a differential signal level applied to steer the composite field left/right or up/down.

Figure 12A:
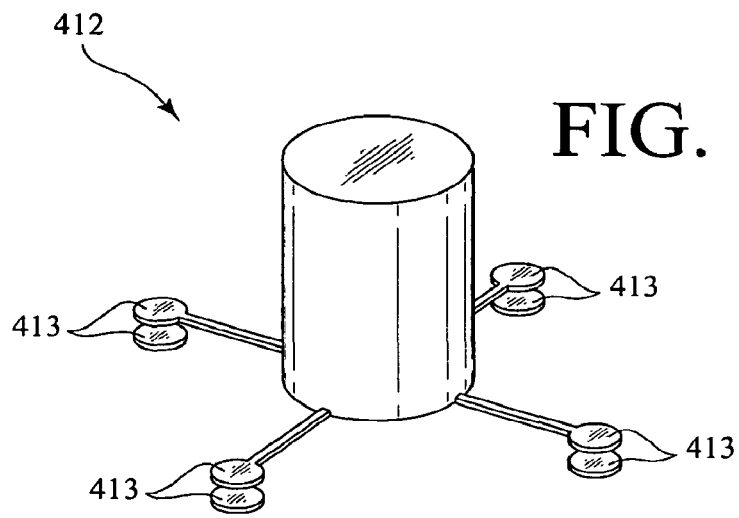
FIG. 12A is a perspective view of a user input device for use with a system for optimizing the orientation of the inductive field of a hearing aid compatible device.
Figure 12B:
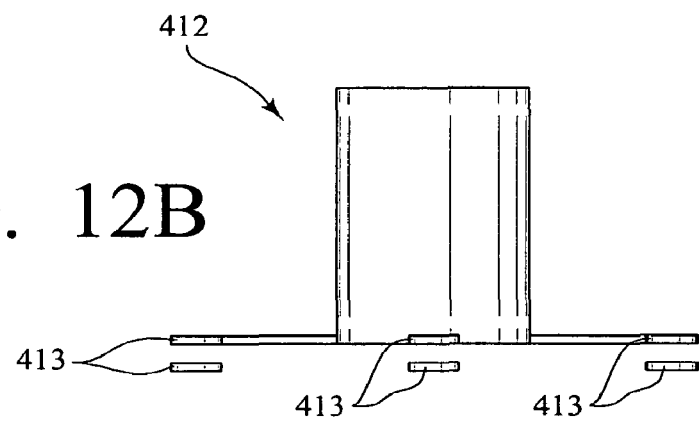
FIG. 12B is a side view of the user input device of FIG. 12A.
Figure 12C:
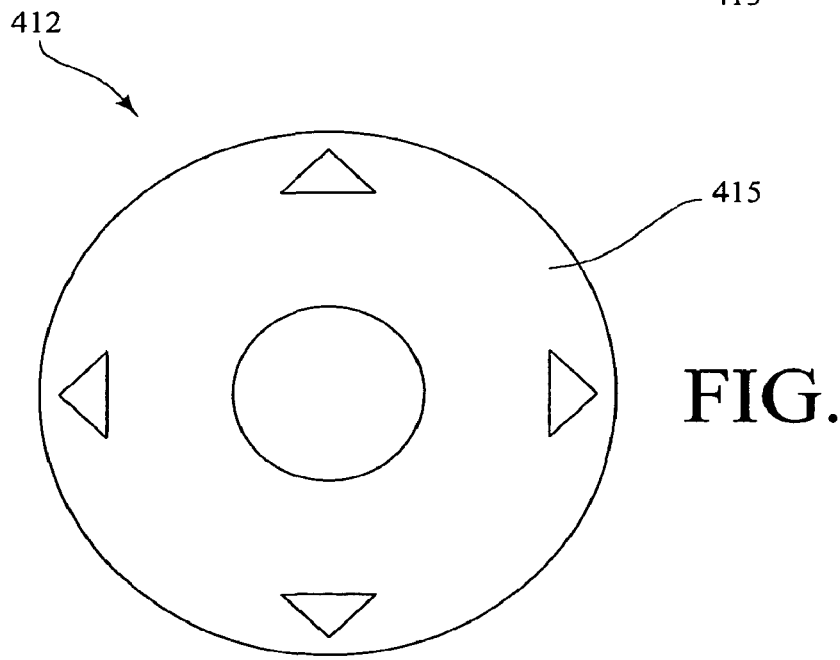
FIG. 12C is a top view of the user input device of FIG. 12A, further having a directional ring covering the activation contacts.

Such displays would be used with a user input device 412, such as the joystick type device as shown in FIGS. 12A, 12B and 12C, to make changes to the signal strength levels of each telecoil. FIG. 12A shows a joystick type user input device 412 having activation contacts 413. FIG. 12B shows a side view of the joystick type user input device 412, having activation contacts 413. FIG. 12C shows a top view of the joystick type user input device 412 having a directional ring 415 covering the activation contacts. Thus, the user input device 412 will be able to control either the absolute levels to the telecoils or differential levels to the telecoils, either which will allow steerage of the composite pattern.

As shown in greater detail in FIG. 13, an exemplary system 400 for optimizing the orientation of the inductive field of a HAC device includes: a user input device 412; a control device 416; a display device 414; a first amplifier device 418; a second amplifier device 420; a third amplifier device 422; a first transmitting telecoil 424; a second transmitting telecoil 426; and a third transmitting telecoil 428. Optionally, the system may also have a fourth amplifier device 423, as shown.

The user input device 412 is used to signal a request for a change in the orientation of the inductive field. The user input device 412 may have a mechanism for selecting one of the telecoils and indicating whether the signal level applied to that telecoil should be increased or decreased. Alternatively, the user input device may have a mechanism for selecting whether the composite field should be shifted left/right or up/down, and indication of how much the field should be shifted in the selected direction. The user input device 412 also has a signal output 434 such that the user input signaling is applied at the signal output 434.

A representative input device 412 is a joystick type device as discussed above. Such joystick type devices have become very common on wireless phones. This design makes use of much that is already available on such wireless phones. Other than the additional audio amplifiers and telecoils there is little hardware that will be needed to be added. The additional load that this embodiment will place on the microprocessor, memory, and display of such wireless phones are trivial.

A representative control device 416 is a microprocessor such is very commonly used in almost all modern wireless phones. Thus, the term "control device" refers generically to an electronic circuit which performs arithmetic, logic and control operations with the assistance of internal memory. The control device 416 has a user input interface 450, a display device interface 452, a first gain signal output 454, a second gain signal output 456, and a third gain signal output 458. The control device 416 is in communication with the user input device 412 through the user input interface 450. In use, the control device 416 is operative to receive orientation signaling from the user input device 412 indicating the user's desire to change the orientation of the inductive field of the HAC device. The control device 416 can then process the orientation signaling into a first gain signal, a second gain signal, a third gain signal, and field orientation display information. The field orientation display information could be the data required to generate either of the potential displays shown in FIG. 10 or 11, as described above. Then, the microprocessor 416 outputs the first gain signal at the first gain signal output 454, the second gain signal at the second gain signal output 456, the third gain signal at the third gain signal output 458, and the field orientation display information at the display device interface 452. In practice, the user will likely use an iterative process of adjusting the field orientation, placing the HAC device up to his ear/hearing aid to try out the setting, and then making further adjustments to achieve an optimized orientation.

It should be noted that, while the control device and the representative system 400 of FIG. 13 are described and shown as having three telecoils 424, 426, 428, the exemplary system would also have utility with only two telecoils to create a composite inductive field, as described above. Additionally, one of skill in the art will understand that the principles of the invention may also be applied to other systems having more than three telecoils arranged to create a steerable composite inductive field.

The display device 414 is in communication with the control device 416 through the display device interface 452. The display device 414 provides a graphical representation of the field orientation display information received from the control device 416, which the user can use as an aid in setting the orientation of the inductive field of the system, as described above.

A representative display device is an LCD display, such as is found on many modern wireless phones. The intent is that the telecoil settings will be one of the menu items selectable on the wireless phone. Once activated, it will display the setting parameters on the phone's display until they are accepted by the user, and he exits that section of the menu.

Each of the amplifiers 418, 420, 422 has an input for an audio signal, an input for receiving a gain signal for determining the amount that the amplifier will amplify the audio signal, and an output for the amplified signal. Thus, the first amplifier 418 has a first audio signal input 470, a first gain control input 472 and a first signal output 474, with the first gain control input 472 in communication with the first gain signal output 454 of the control device 416. Likewise, the second amplifier 420 has a second audio signal input 476, a second gain control input 478 and a second signal output 480, with the second gain control input 478 in communication with the second gain signal output 456 of the control device 416. Finally, the third amplifier 422 has a third audio signal input 482, a third gain control input 484 and a third signal output 486, with the third gain control input 484 in communication with the third gain signal output 458 of the control device 416.

A representative amplifier that might be used in such a system is a common LM-386-type amplifier. Other amplifiers having equivalent functionality could certainly be substituted without undue experimentation. Further, the amplifier functionality also may be integrated with other devices into a multi-function integrated circuit, as is known.

Each of the first amplifier 418, the second amplifier 420 and the third amplifier 422 is operative to receive a common audio signal at the respective audio signal input 470, 476, 482, receive a gain signal at the respective gain control input 472, 478, 484, amplify the audio signal based on the respective gain signal, and output the amplified audio signal at the respective signal output 474, 480, 486.

Each of the first telecoil 424, the second telecoil 426 and the third telecoil 428 is operatively connected to the signal output 474, 480, 486 of the respective amplifier. The second telecoil 426 is positioned substantially orthogonal to the first telecoil 424. Further, the third telecoil 428 is positioned substantially orthogonal to both the first telecoil 424 and the second telecoil 426, such that a composite inductive field will be created by the 3-D orthogonal telecoil array.

A representative telecoil that might be used in the system is commonly known within the hearing aid industry, but can loosely be described as a small coil of wire wrapped around a core with the core material usually being composed of a ferrite based material.

As mentioned, the system may also optionally have a fourth amplifier device 423 that can be integrated into the system 400 to control the overall volume or drive level of the system, as discussed above in the description of the system for optimizing the drive level of the inductive signal. In this configuration, the fourth amplifier device 423 is positioned between the audio signal and the audio signal inputs 470, 476, 482 of each of the first amplifier, the second amplifier and the third amplifier. The user input device 412 can then be used to signal a request for a change in the overall drive level of the inductive signal to the control device 416 much as is done with a volume control. The control device 416 will process this drive level signaling into an overall gain signal and communicate this information to a gain control input 490 on the fourth amplifier device 423. The fourth amplifier device 423 will then control the level of the common signal that is input into the other amplifiers, and, thus, the relative output level of the other amplifiers.

Figure 14:
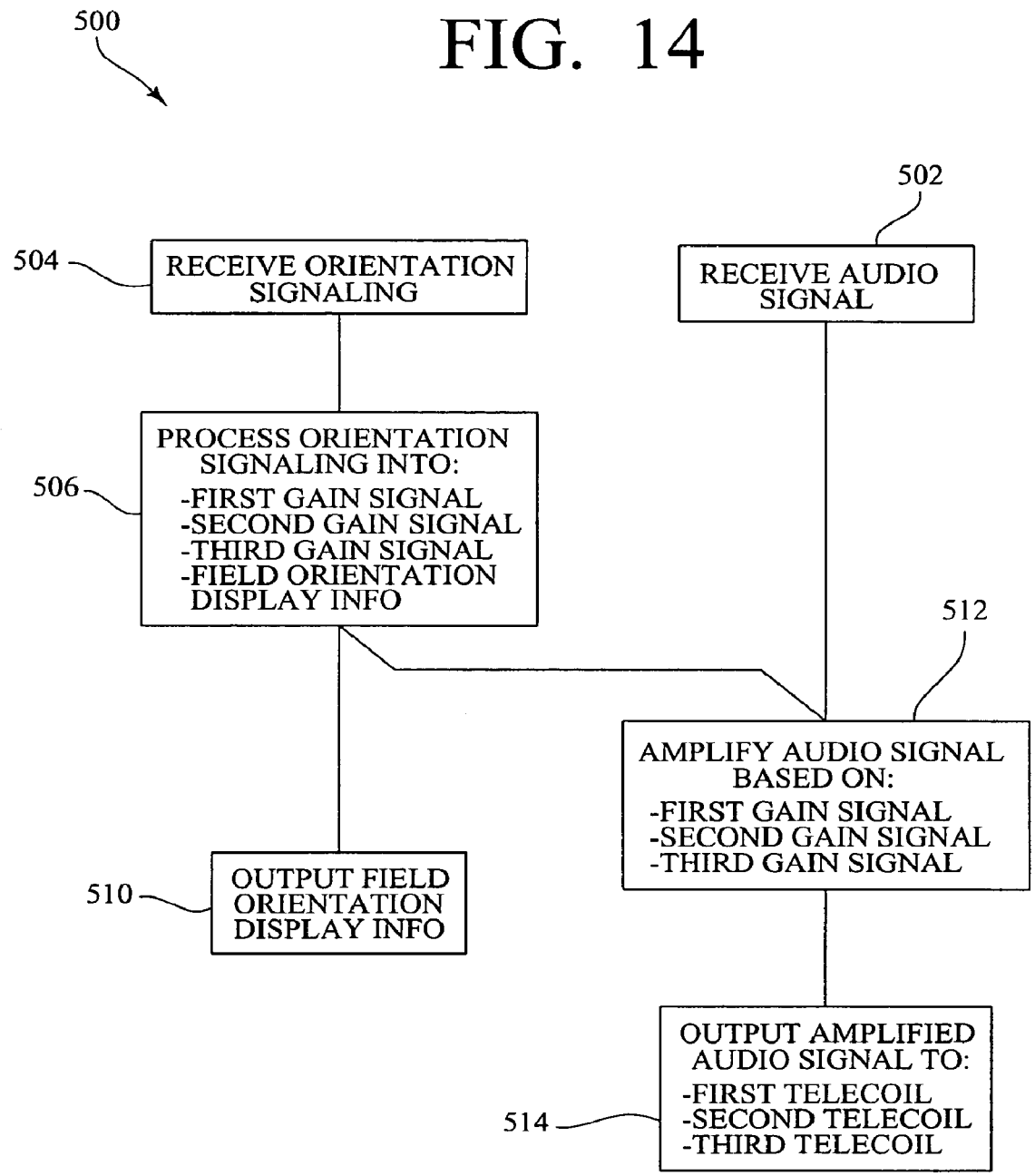
FIG. 14 is a flow diagram of a method utilizing the system of FIG. 13.

Thus, as shown in FIG. 14, a method 500 for optimizing the orientation of the inductive field of a hearing aid compatible device using such a system would include the steps of: 502 receiving an audio signal at an audio signal input; 504 receiving orientation signaling from a user input; 506 processing the orientation signaling into a first gain signal, a second gain signal, a third gain signal, and field orientation display information; 510 outputting the field strength information to a display device; 512 amplifying said audio signal based on the first gain signal, the second gain signal and the third gain signal into a first amplified audio signal, a second amplified audio signal and a third amplified audio signal, respectively; and 514 outputting the first amplified audio signal, the second amplified audio signal and the third amplified audio signal to a first transmitting telecoil, a second transmitting telecoil and a third transmitting telecoil, respectively.

Figure 15:
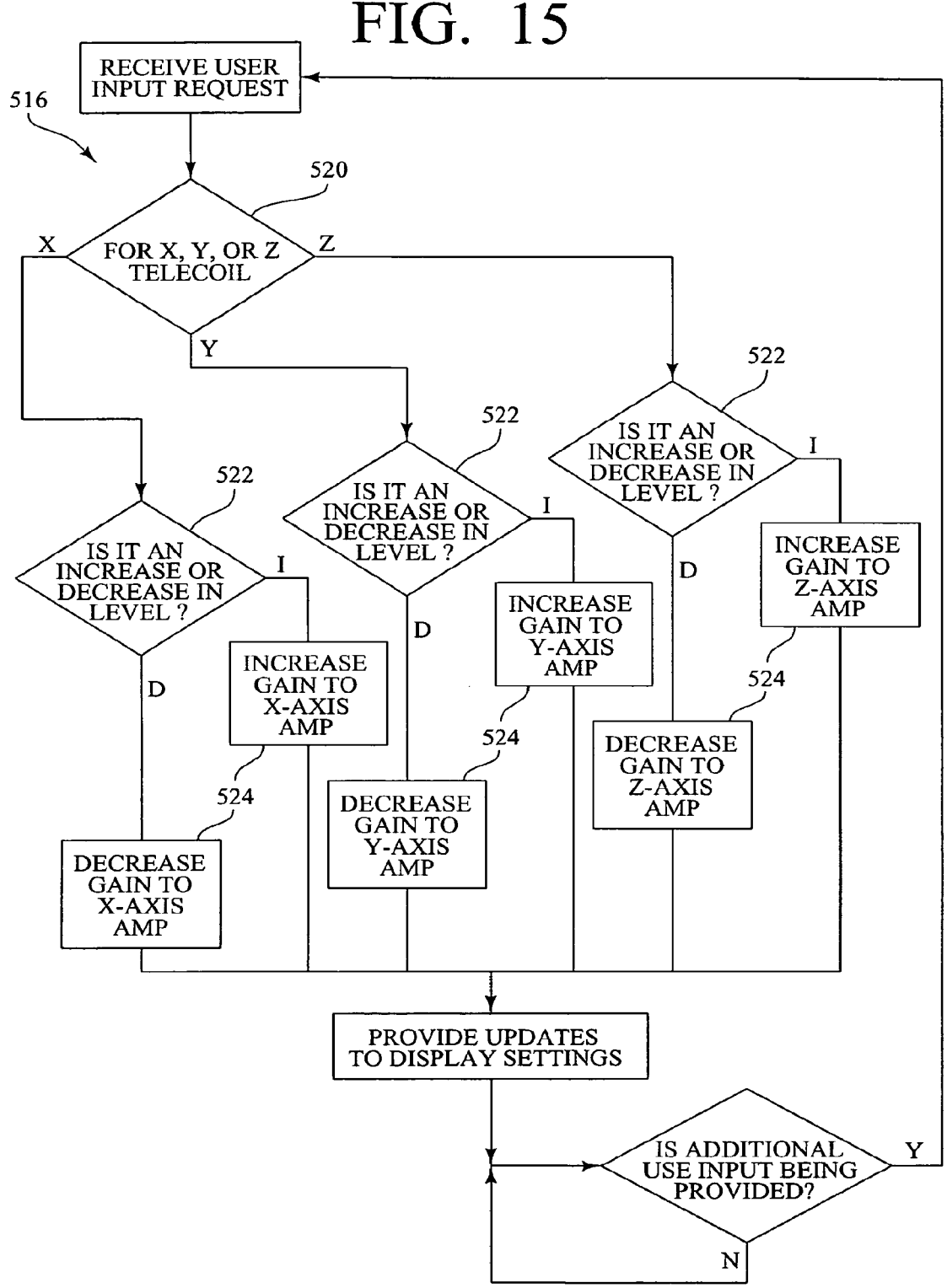
FIG. 15 is a flow diagram of the steps involved in processing orientation signaling in an exemplary absolute level control scenario.
Figure 16:
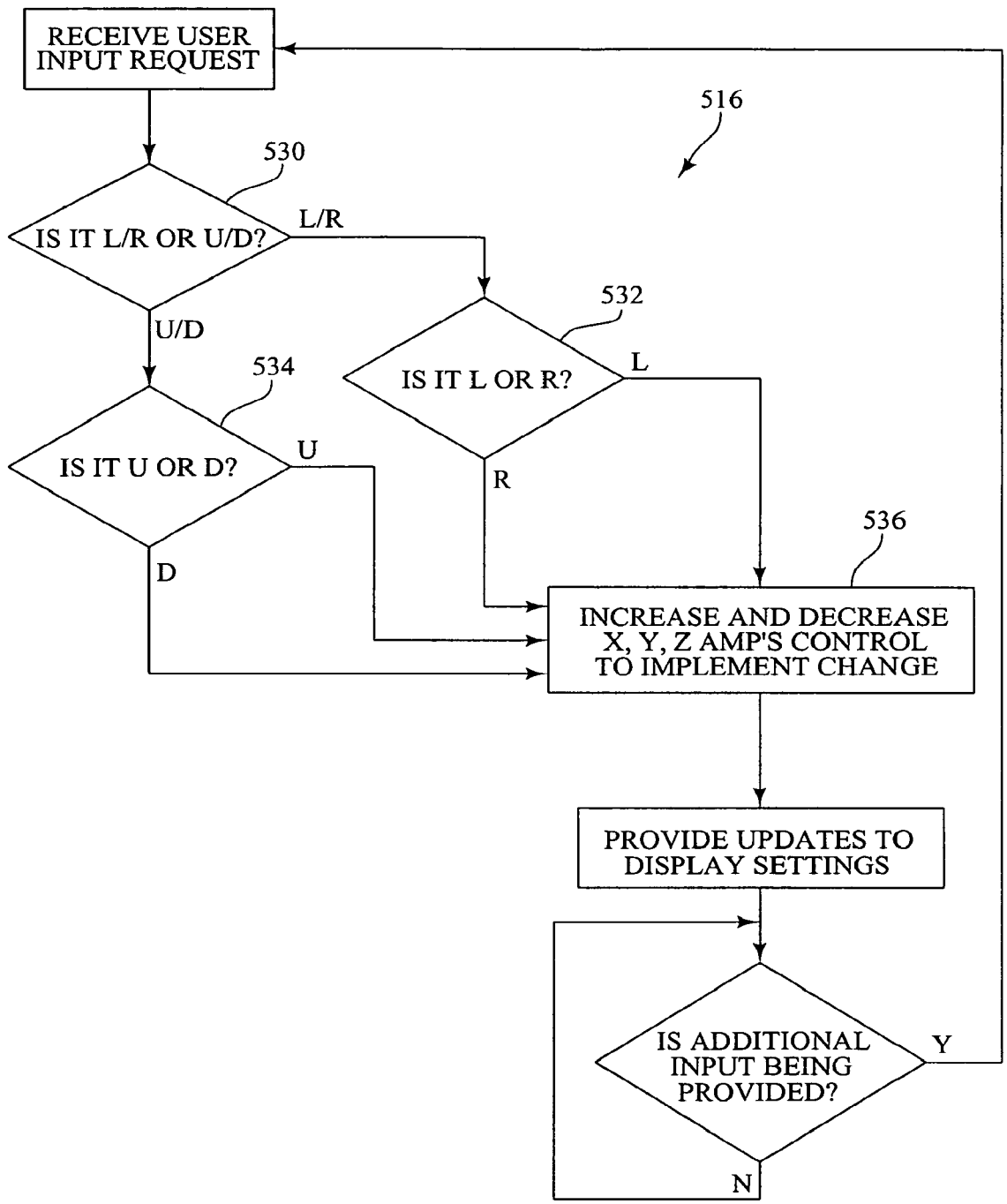
FIG. 16 is a flow diagram of the steps involved in processing orientation signaling in an exemplary differential level control scenario.

FIGS. 15 and 16 provide additional detail regarding the steps involved in processing the orientation signaling in an exemplary absolute level control scenario 516 and in an exemplary differential level control scenario 518, respectively. For instance, in the absolute level control scenario 516 (FIG. 15), the first step 520 is determining if the orientation signaling is for the X, Y or Z telecoil. The next step 522 is determining if the orientation signaling is for an increase or decrease in the level of the selected X, Y or Z telecoil. The next step 524 is then either decreasing or increasing the gain signal to the selected telecoil. In the differential level control scenario 518 (FIG. 16), the first step 530 is determining if the orientation signaling is for left/right control or for up/down control. If the orientation signaling is for left/right control, the next step 532 is determining if the orientation signaling is for left or right control. If the orientation signaling is for up/down control, the next step 534 is determining if the orientation signaling is for up or down control. Depending on the results of the preceding steps, the next step 536 is to increase and decrease X, Y and Z amps control to implement the change.

2. 3-D Orthogonal Telecoil Array

Phase Steering

Figure 17:
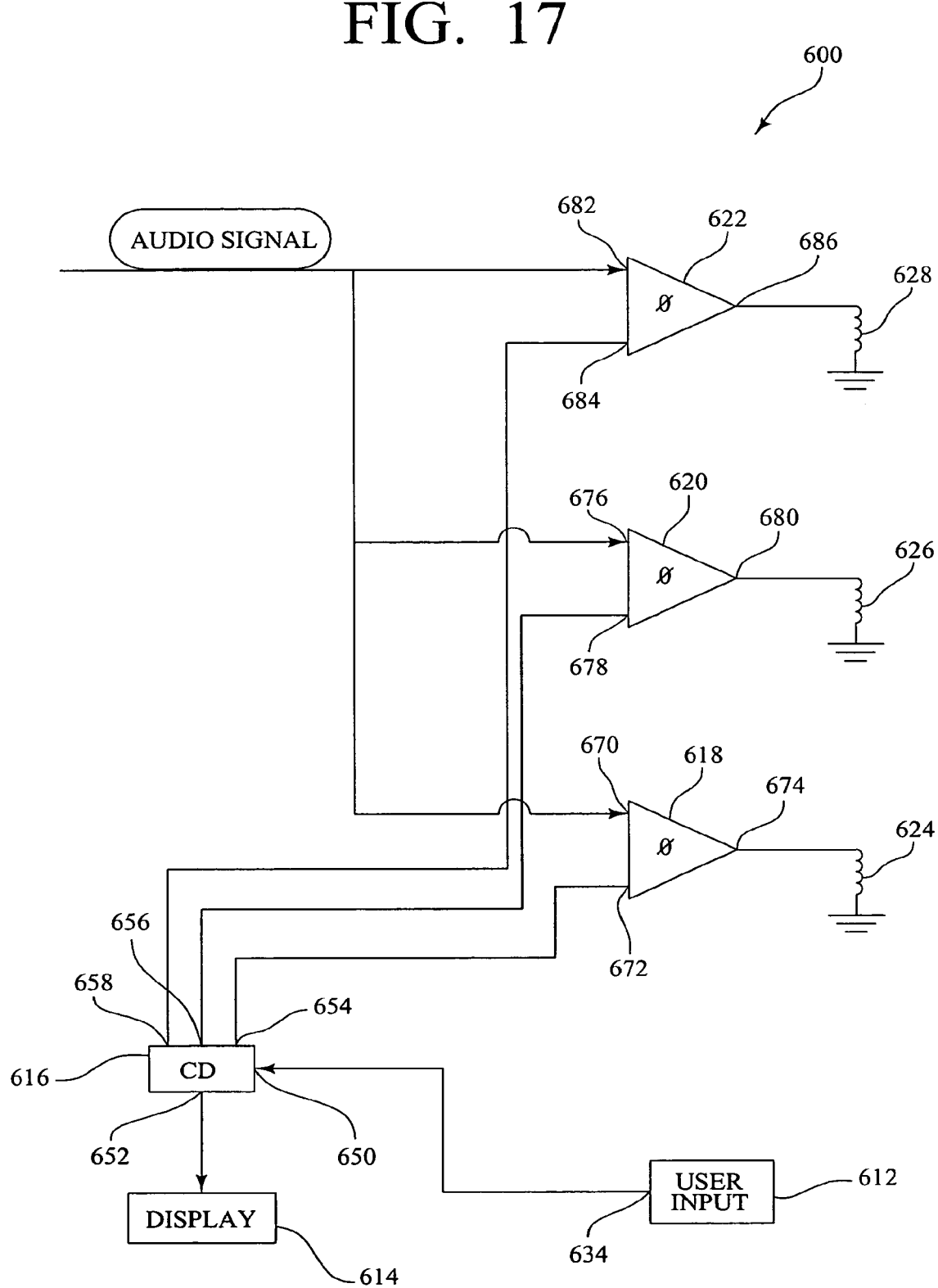
FIG. 17 is a diagram of an alternate system for optimizing the orientation of the inductive field of a hearing aid compatible device.

As shown in FIG. 17, an alternate system 600 for steering the composite field of a 3-D orthogonal telecoil array is to utilize phase control devices instead of the amplifiers described above. Such a system has a user input device 612, a control device 616, a display device 614, a first phase control device 618, a second phase control device 620, a third phase control device 622, a first transmitting telecoil 624, a second transmitting telecoil 626 and a third transmitting telecoil 628.

In this configuration, the user input device 612 is again used to signal a request for a change in the orientation of the inductive field. This request signal is communicated to the control device 616 which processes the orientation into first, second and third phase signals, and field orientation display information. The composite magnetic field can be shifted in different directions by introducing different delays to the signals exciting each of the telecoils.

The control device 616 has a user input interface 650, a display device interface 652, a first phase signal output 654, a second phase signal output 656, and a third phase signal output 658. The control device 616 is in communication with the user input device 612 through the user input interface 650. In use, the control device 616 is operative to receive orientation signaling from the user input device 612 indicating the user's desire to change the orientation of the inductive field of the HAC device. The control device 616 can then process the orientation signaling into a first phase signal, a second phase signal, a third phase signal, and field orientation display information by computing the phase-shifts necessary to produce the desired magnetic pattern. Then, the control device 616 outputs the first phase signal at the first phase signal output 654, the second phase signal at the second phase signal output 656, the third phase signal at the third phase signal output 658, and the field orientation display information at the display device interface 652.

Each of the phase control devices has an audio signal input 670, 676, 682 for an audio signal, a phase control input 672, 678, 684 for receiving the phase signal, and a signal output 674, 680, 686 for the phase-shifted signal. Each phase control device is operative to receive the audio signal and delay or phase-shift the signal by an amount based on the phase signal received at the phase control input. Thus, the first phase control device 618 has a first audio signal input 670, a first phase control input 672 and a first signal output 674, with the first phase control input 672 in communication with the first phase signal output 654 of the control device 616. Likewise, the second phase control device 620 has a second audio signal input 676, a second phase control input 678 and a second signal output 680, with the second phase control input 678 in communication with the second phase signal output 656 of the control device 616. Finally, the third phase control device 622 has a third audio signal input 682, a third phase control input 684 and a third signal output 686, with the third phase control input 684 in communication with the third phase signal output 658 of the control device 616.

A representative phase control device is a MX609 integrated circuit, manufactured by MX.COM, Inc. The MX609 integrated circuit is a voice codec that is used to convert analog speech to digital which can then be delayed in the digital domain by storing them in memory until the desired delay time has expired and then converting the digital bits back into analog voice. Since a wireless phone already has a voice codec in it, it may be possible to piggyback this functionality onto it. A similar codec, the CMX639, is made by Consumer Microcircuits Limited. A totally integrated system on a chip is a MAD4868A, manufactured by Micronas GmbH.

Figure 18A:
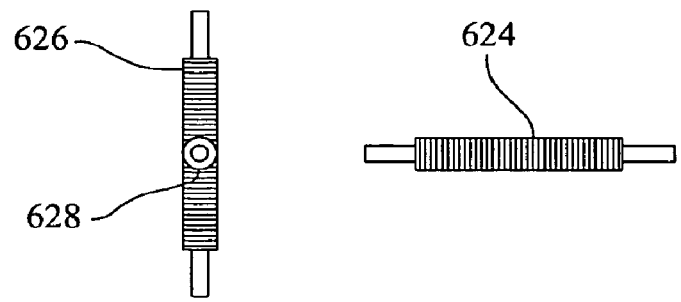
FIG. 18A is a side view of an array of telecoils for the alternate system for optimizing the orientation of the inductive field of a hearing aid compatible device of FIG. 17.
Figure 18B:
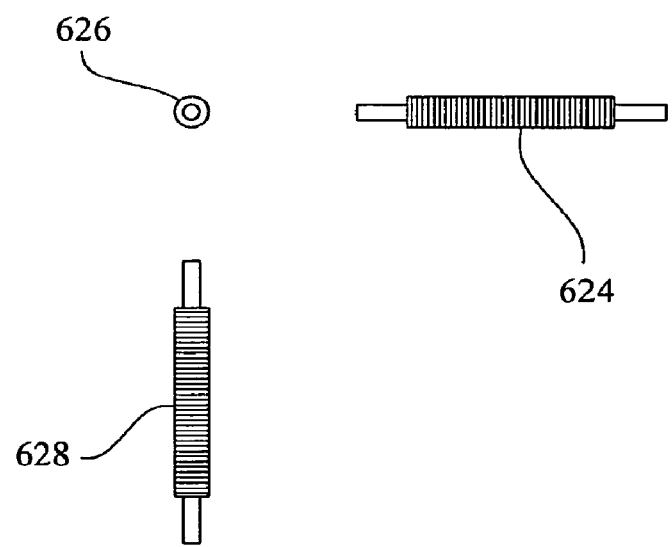
FIG. 18B is a top view of the array of telecoils of FIG. 18A.

Each of the first telecoil 624, the second telecoil 626 and the third telecoil 628 is operatively connected to the signal output 674, 680, 686 of the respective phase control device. Further, as discussed above and shown in FIGS. 18A and 18B, the telecoils may be arranged in a 3-D, substantially orthogonal array with spatial separation, or alternately may be arranged in a 2-D linear array such that a composite inductive field will be created. FIG. 18A is a side view of, and FIG. 18B is a top view of a 3-D, substantially orthogonal array as might be used with the exemplary phase steering system. The telecoils are still oriented on the same three axis as shown previously; however, they have greater physical separation. This is necessary in order to form beam patterns with the delays.

Figure 19:
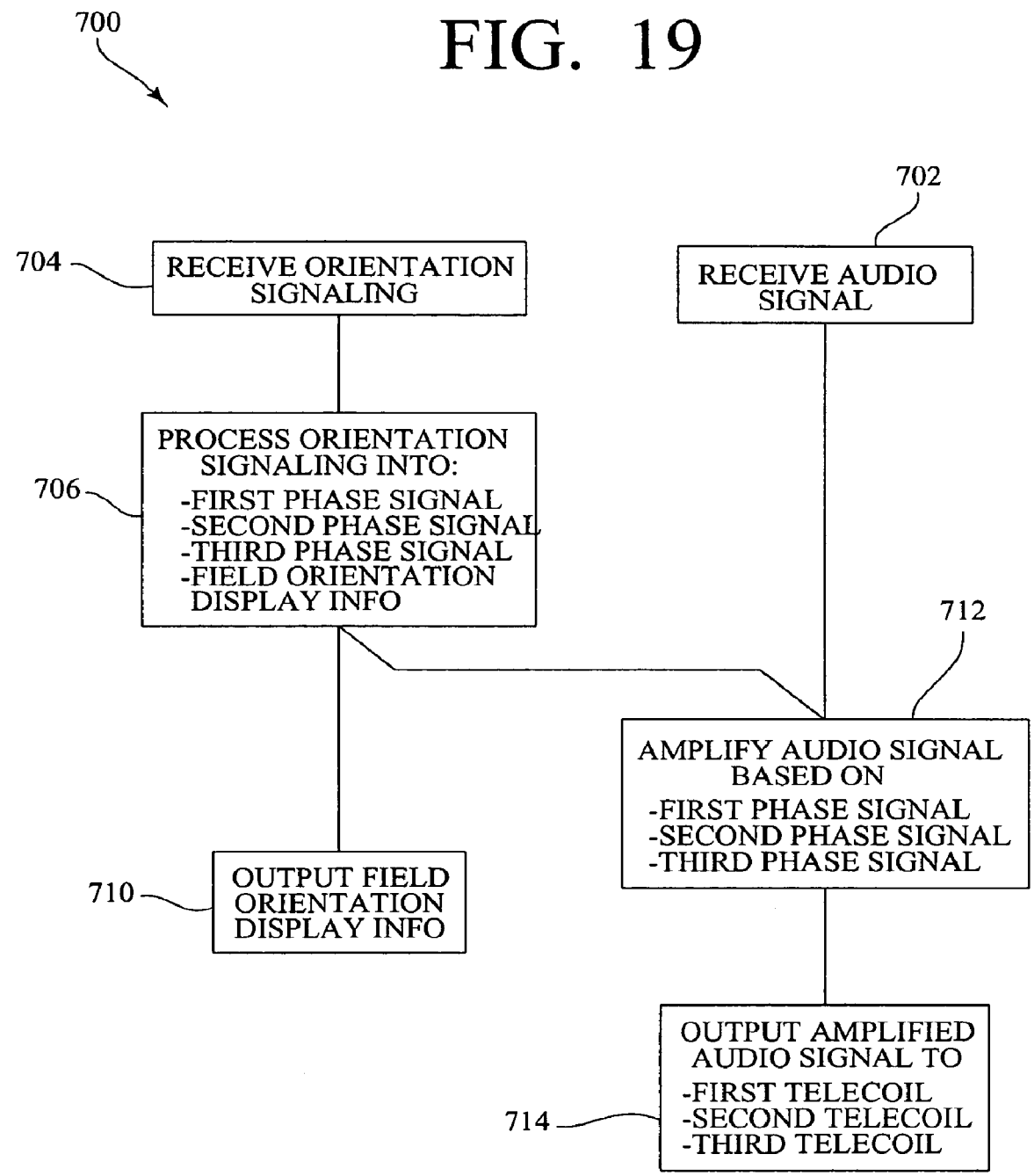
FIG. 19 is a flow diagram of a method utilizing the alternate system of FIG. 17.

Thus, as shown in FIG. 19, a method 700 for optimizing the orientation of the inductive field of a hearing aid compatible device using such a system would include the steps of: 702 receiving an audio signal at an audio signal input; 704 receiving orientation signaling from a user input; 706 processing said orientation signaling into a first phase signal, a second phase signal, a third phase signal, and field orientation display information; 710 outputting said field strength information to a display device; 712 phase-shifting said audio signal based on said first phase signal, said second phase signal and said third phase signal into a first phase-shifted audio signal, a second phase-shifted audio signal and a third phase-shifted audio signal, respectively; and 714 outputting said first phase-shifted audio signal, said second phase-shifted audio signal and said third phase-shifted audio signal to a first transmitting telecoil, a second transmitting telecoil and a third transmitting telecoil, respectively.

3. Switched Telecoil Array

Figure 20:
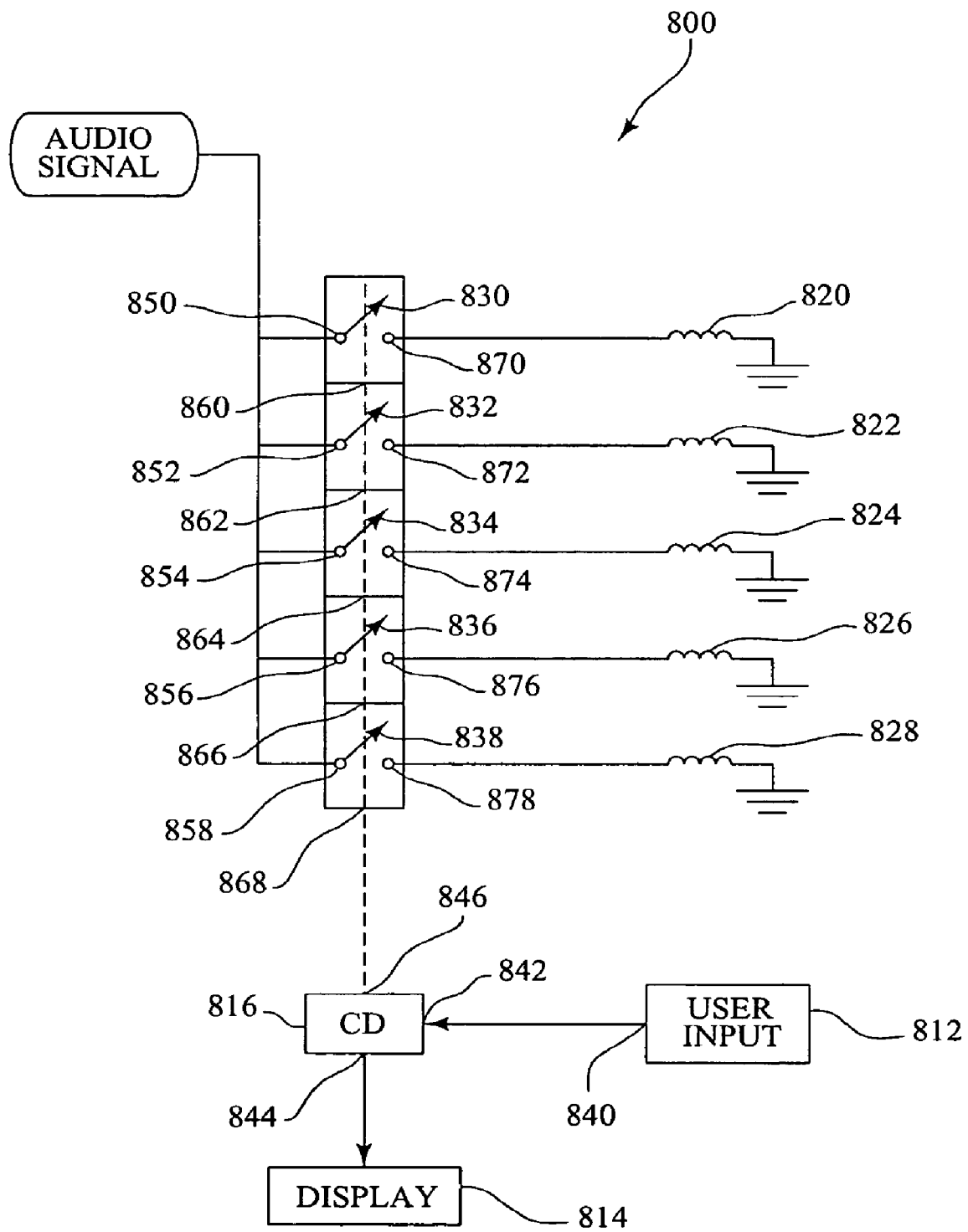
FIG. 20 is a diagram of yet another alternate system for optimizing the orientation of the inductive field of a hearing aid compatible device.

FIG. 20 shows another exemplary embodiment for a system 800 for optimizing the orientation of the inductive field of a hearing aid compatible device. The system 800 utilizes multiple telecoils in an array, arranged such that each telecoil has a different orientation, allowing the user to select the telecoil that best matches the orientation of the hearing aid telecoil.

FIGS. 21A, 21B and 21C show the front, side and bottom views of an exemplary array containing multiple telecoils. The array shown contains five telecoils 820, 822, 824, 826, 828. Alternatively, a 3-D orthogonal array could be utilized, such as described above. Still further, any number of telecoils could be used with a variety of orientations.

Figure 22A:
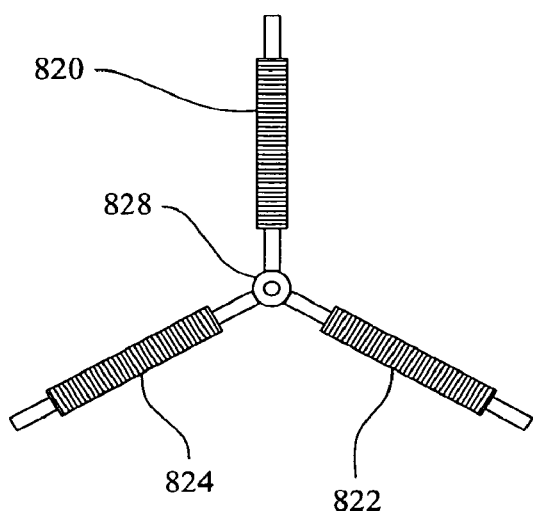
FIG. 22A is a front view of another telecoil array for the alternate system of FIG. 20.
Figure 22B:
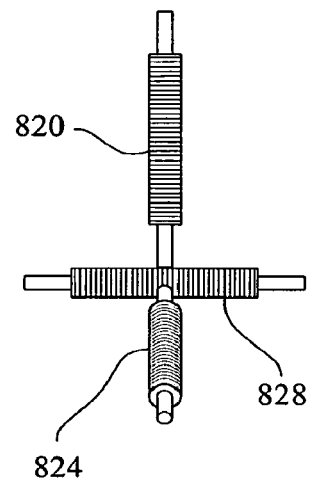
FIG. 22B is a side view of the telecoil array of FIG. 22A.
Figure 23A:
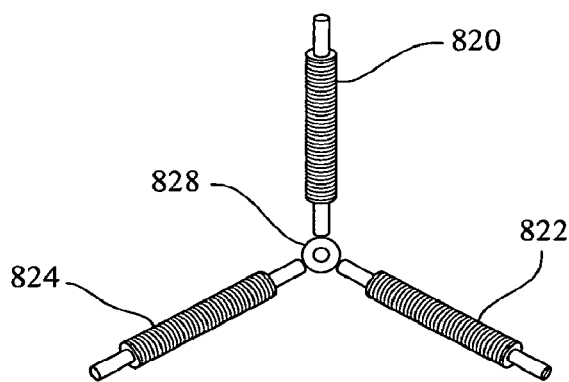
FIG. 23A is a front view of yet another telecoil array for the alternate system of FIG. 20.
Figure 23B:
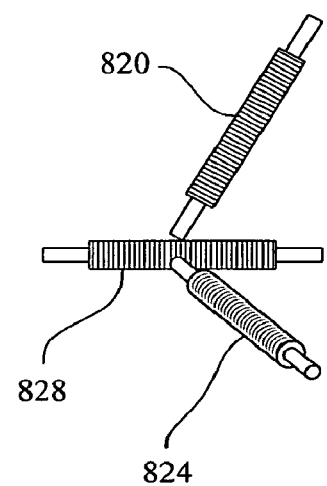
FIG. 23B is a side view of the telecoil array of FIG. 23A.

Additional illustrative examples could entail four telecoils, as shown in FIGS. 22A, 22B, 23A and 23B. FIGS. 22A and 22B are front and side views of an array containing four telecoils 820, 822, 824, 828. FIGS. 23A and 23B are front and side views of another array containing four telecoils 820, 822, 824, 828.

Figure 24:
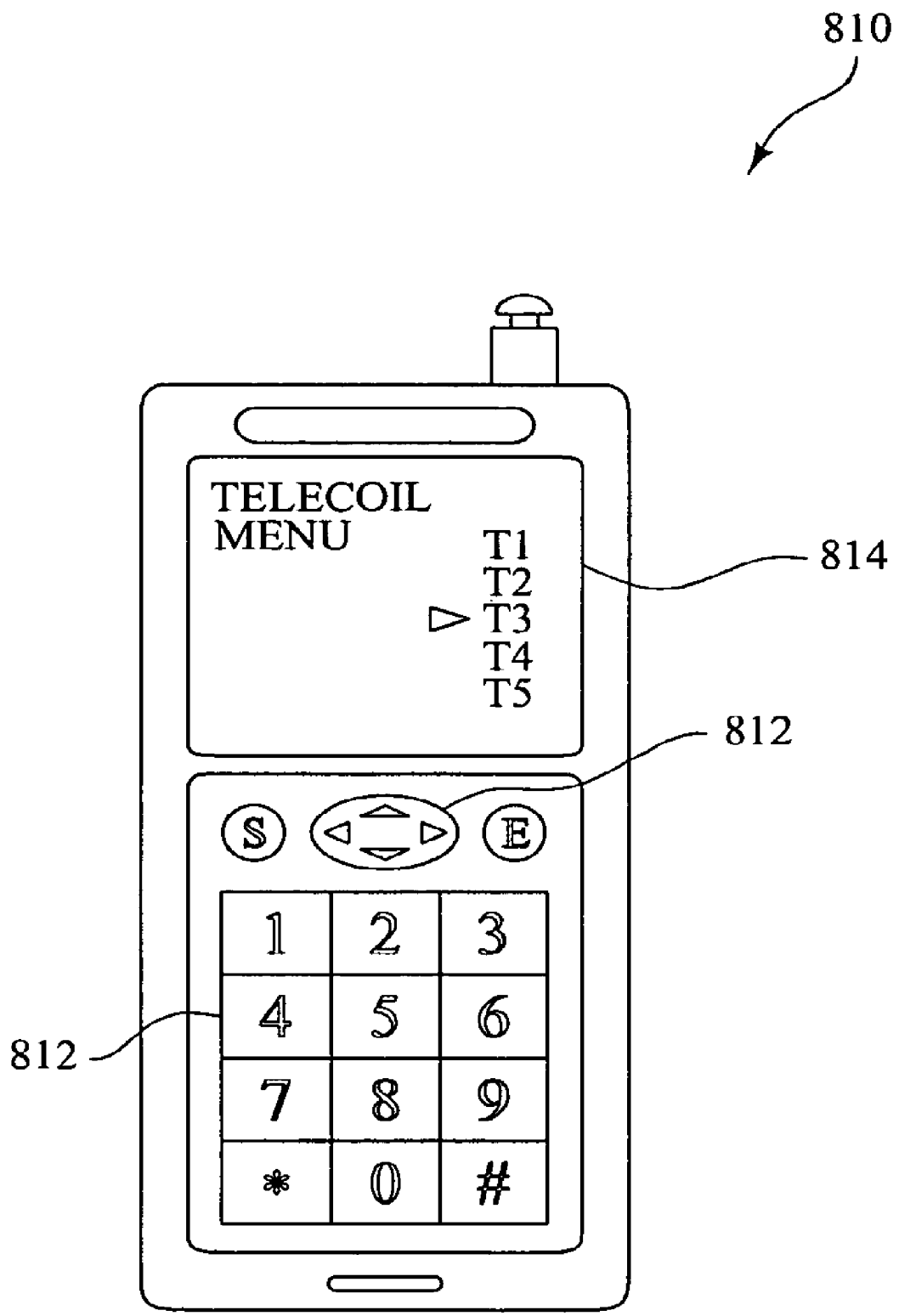
FIG. 24 is a view of a representative hearing aid compatible device incorporating the alternate system of FIG. 20.

FIG. 24 shows a HAC device 810 that may incorporate such an exemplary system, such as a wireless telephone. Such a HAC device may have a user input device 812, such as a keypad or a joystick pad, as shown, and a display device 814, such as an LCD display. Again, in operation the user might access the system through a menu system with the assistance of a menu button. Upon calling up the system, the display device 814 may present a graphical representation of the currently selected telecoil, or another representation of the current orientation of the inductive field of the system. The user may then use the user input device 812 to select another telecoil in the array, or, in other words, to change the orientation of the inductive field of the system.

Returning now to FIG. 20, an exemplary system 800 for optimizing the orientation of the inductive field of a HAC device includes: a user input device 812; a control device 816; a display device 814; a plurality of electronic switches 830, 832, 834, 836, 838; and a plurality of telecoils 820, 822, 824, 826, 828.

The user input device 812 such as a joystick-type device as described above, is used to signal a request for a change in the orientation of the inductive field through selection of whichever telecoil best matches the orientation of the hearing aid telecoil. Thus, the user input device 812 has a mechanism for signaling a change in the orientation of the inductive field. The user input device 812 has a signal output 840, where the user input device signaling is output.

The control device 816, such as a microprocessor as described earlier, has a user input device interface 842, a display device interface 844, and a switch control interface 846. The control device 816 is in communication with the user input device 812 through the user input interface 842. In use, the control device 816 is operative to receive orientation signaling from the user input device 812 indicating the user's desire to change the orientation of the inductive field of the HAC device 810, which in this case is accomplished through switching the audio signal to a different telecoil in the array. The control device 816 can then process the orientation signaling into a switch control signal for switching the audio signal to the selected telecoil. Additionally, the control device 816 processes the orientation signaling into telecoil selection display information for providing a visual feedback to the user of the particular telecoil selected. Then, the control device 816 outputs the switch control signal to the switch control interface 846, and outputs the telecoil selection display information at the display device interface 844.

The display device 814 is in communication with the control device 816 through the display device interface 844. The display device 814, such as an LCD display as described earlier, provides a graphical representation of the telecoil selection display information received from the control device 816. The user can use this information as an aid in setting the orientation of the inductive field of the system 800 since each telecoil 820, 822, 824, 826, 828 of the array has a different orientation.

Each of the switches 830, 832, 834, 836, 838 has an audio signal input 850, 852, 854, 856, 858, a switch control signal input 860, 862, 864, 866, 868, and a switch signal output 870, 872, 874, 876, 878. Again five switches are shown 830, 832, 834, 836, 838, corresponding to the five telecoils 820, 822, 824, 826, 828 shown in FIGS. 21A, 21B and 21C. However, should a different number of telecoils be utilized, a corresponding adjustment to the number of switches would also be required. The audio signal input 850, 852, 854, 856, 858 of each switch is connected to a common audio signal source. The switch control signal input 860, 862, 864, 866, 868 of each switch is connected to the control device switch control signal interface 846. The control signal input 860, 862, 864, 866, 868 of each switch determines whether that switch is in an open or closed state. In the closed state, the switch will pass the audio signal through to the switch signal output. In this embodiment, only one of the switches should typically operate in a closed state at any given time.

Each of the telecoils 820, 822, 824, 826, 828 is operatively connected to a switch signal output 870, 872, 874, 876, 878 of a corresponding switch. As described above, the telecoils are arranged such that each telecoil has a different orientation. Thus, the orientation of the inductive field emitted by the system may be optimized by selecting the telecoil that best matches the orientation of a telecoil contained in a user's hearing aid.

Figure 25:
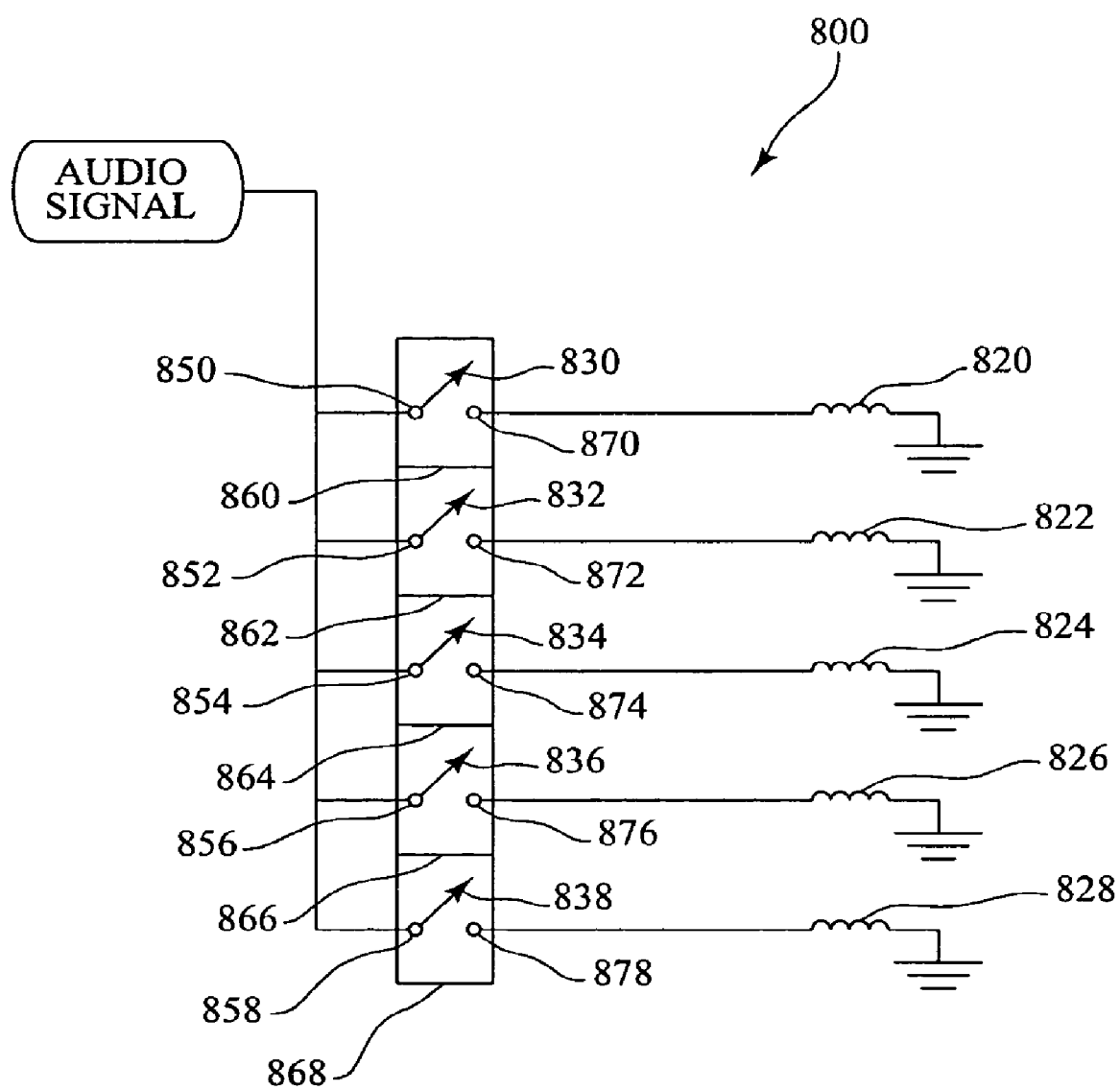
FIG. 25 is a diagram of an implementation of the alternate system of FIG. 20 utilizing manual switches.

Alternatively, as shown in FIG. 25, an implementation of a switched telecoil array may be as simple as manual switches to select one of the telecoils. Thus, the use of a user input device, a control device, and a display device would not be needed.

Figure 26:
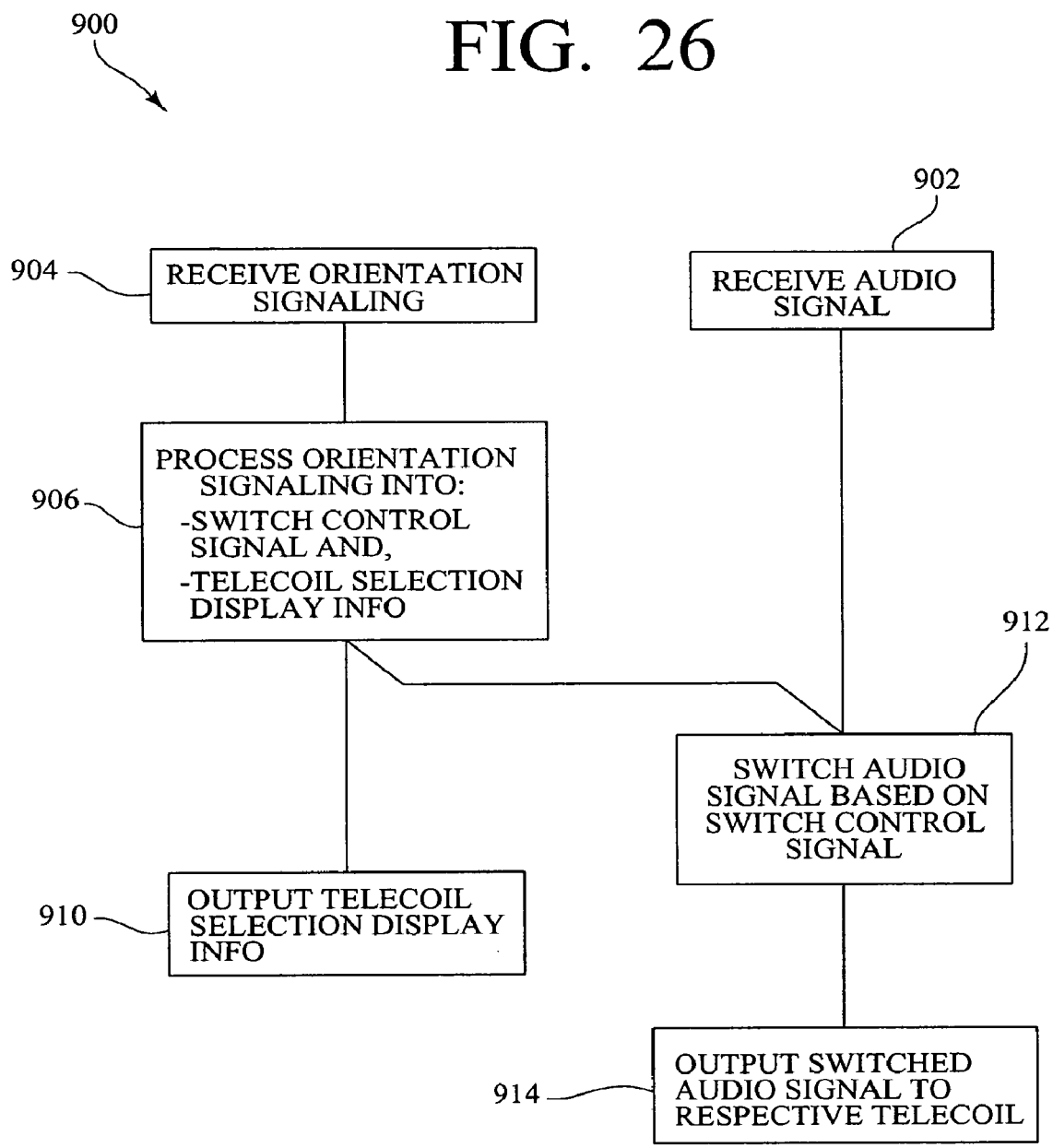
FIG. 26 is a flow diagram of a method utilizing the system of FIG. 20.

Thus, as shown in FIG. 26, a method 900 for optimizing the orientation of the inductive field of a HAC device using such a system would include the steps of: 902 receiving an audio signal at an audio signal input; 904 receiving orientation signaling from a user input; 906 processing said orientation signaling into a switch control signal, and telecoil selection display information; 910 outputting said telecoil selection information to a display device; 912 switching said audio signal based on said switch control signal; and 914 outputting said switched audio signal to a respective transmitting telecoil.

4. Physical Orientation of Telecoil

Figure 27:
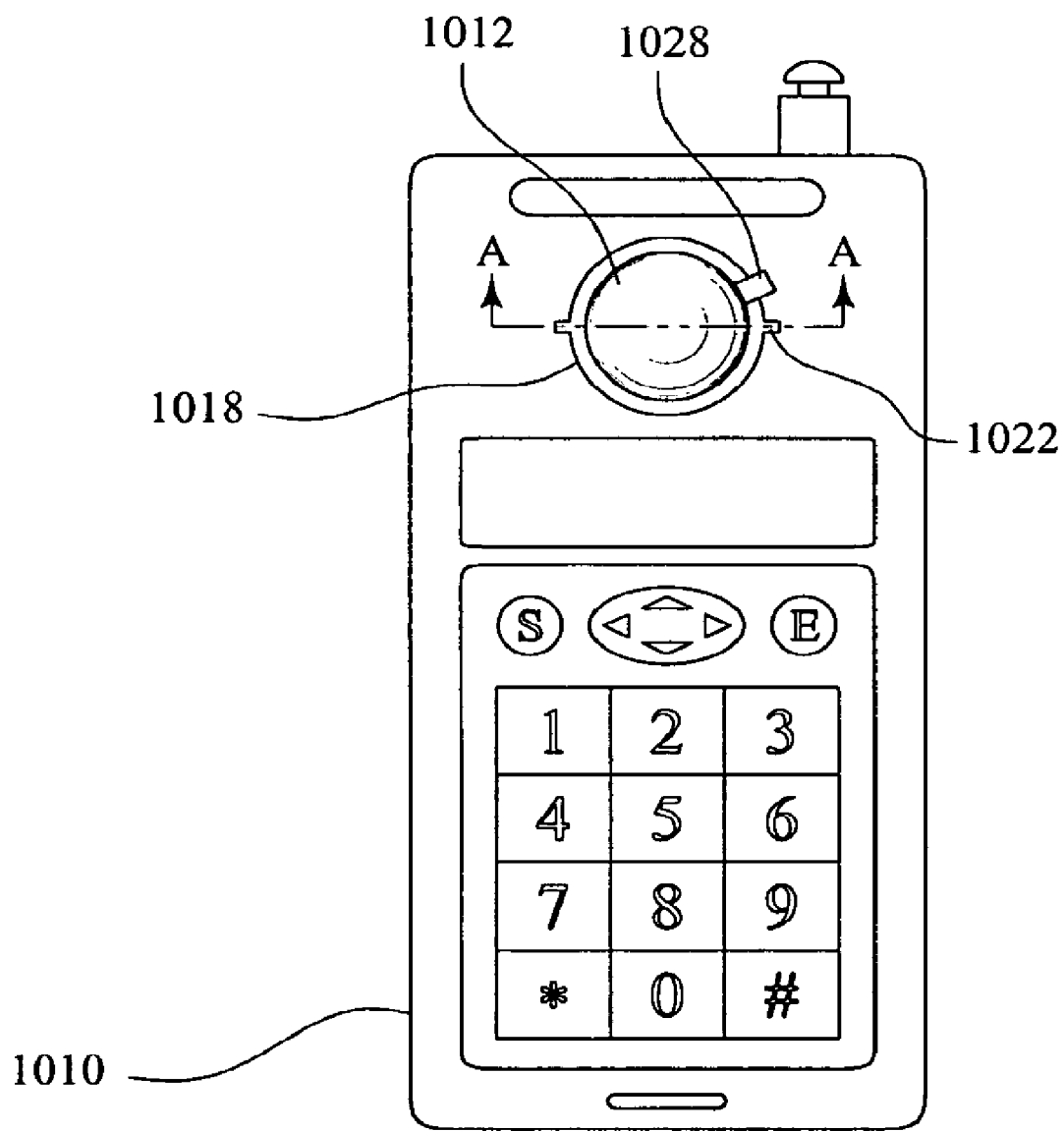
FIG. 27 is a view of a representative hearing aid compatible device incorporating yet another alternate system for optimizing the orientation of the inductive field of a hearing aid compatible device.
Figure 28:
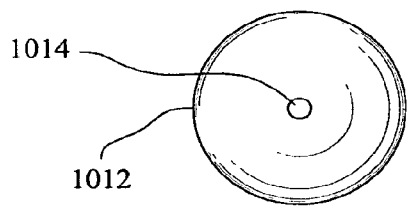
FIG. 28 is a detail drawing of a rotatable ball having a telecoil for use with the alternate system of FIG. 27.

Another alternate embodiment for a system for optimizing the orientation of the inductive field of a hearing aid compatible device utilizes a single telecoil embedded in a ball or other substantially spherical shaped element, such that the telecoil itself may be physically oriented for optimal coupling with a hearing aid telecoil. FIG. 27 shows a HAC device 1010 having a rotatable ball 1012. The rotatable ball 1012 contains a telecoil 1014, as best shown in FIG. 28 and in the sectional views (taken through section line A-A of FIG. 27) of FIGS. 29-30. The rotatable ball 1012 may be made of a material such as plastic. As best shown in FIG. 30, the rotatable ball 1012 containing the telecoil 1014 resides within a semi-spherical enclosure 1016, or socket, that allows the ball to be rotated by the user's finger. The telecoil 1014 is operatively connected to an audio signal source via flexible leads or slide contacts. Thus, the telecoil 1014 is capable of mechanical orientation or reorientation via physical manipulation in three dimensions.

Figure 30:
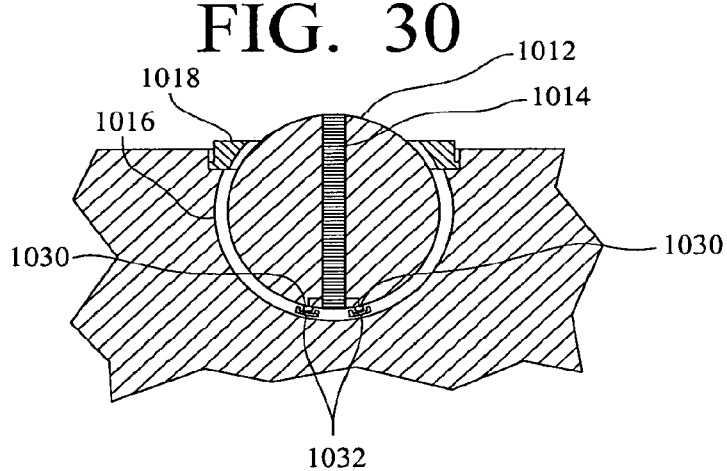
FIG. 30 is a partial sectional view of the HAG device and rotatable ball, taken through section line A-A of FIG. 27, showing another operative connection of the telecoil.
Figure 31:
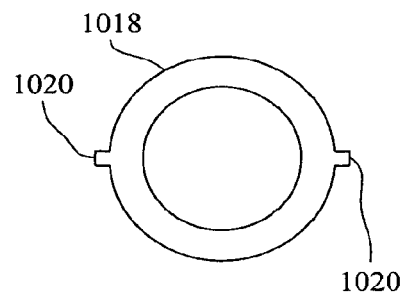
FIG. 31 is a top view of a retaining ring for use with the alternate system of FIG. 27.
Figure 32:
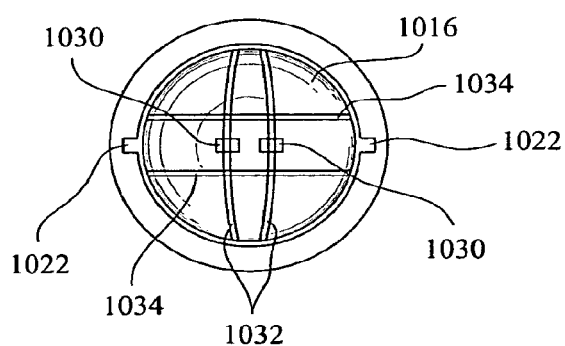
FIG. 32 is a top view of a semi-spherical enclosure having contact strips for use with an embodiment having another operative connection of the telecoil of the alternate system of FIG. 27.

As best shown in FIGS. 30-31, a captive or retaining ring 1018 is used to prevent the ball 1012 from falling from the semi-spherical enclosure 1016. Such retaining ring 1018 has tabs 1020 on its edges which mate with slots 1022 in the spherical enclosure, as shown in FIG. 32. Placing the retaining ring 1018 in the semi-spherical enclosure 1016 and rotating the ring 1018 locks it into position.

Figure 29:
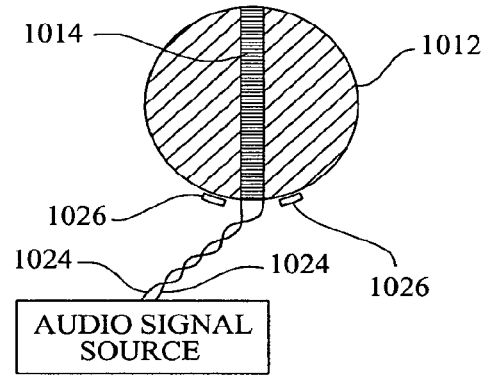
FIG. 29 is a sectional view of the rotatable ball only, taken through section line A-A of FIG. 27, showing one operative connection of the telecoil.

In the exemplary embodiment shown in FIG. 29, flexible leads 1024 extending from the back of the ball 1012 interconnect the telecoil 1014 to the audio signal source. Tabs 1026 on the back of the ball 1012 would prevent rotation of the ball beyond the range that could lead to stress of the flexible leads 1024 or that would be of use to the user. A bit less than 180 degrees is the maximum rotation that would be of practical use.

As shown in FIG. 27, a locking device 1028 would allow the ball to be secured in a fixed position once the optimal position was obtained.

Figure 33:
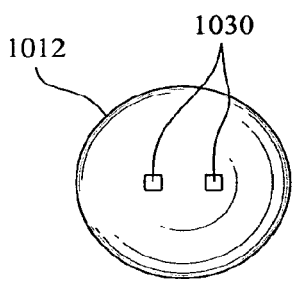
FIG. 33 is a bottom view of a rotatable ball for use with the embodiment having the operative connection shown in FIG. 32.

In another exemplary embodiment, shown in FIGS. 30, 32 and 33, the telecoil 1014 in the ball 1012 is connected to the audio signal source via a set of slide contacts 1030 on the back of the ball that mate with movable contact strips 1032 within the spherical enclosure 1016. The slide contacts 1030 slide on the movable contact strips 1032 to allow the ball 1012 to rotate in a first plane. The movable contact strips 1032 are separately in contact with one each respectively of a set of stationary contact strips 1034. The set of stationary contact strips 1034 allow the movable contact strips 1032 to move in place perpendicular to the first plane. Thus the slide contacts 1030, the movable contact strips 1032, and the stationary contact strips 1034 allow full rotation of the ball 1012 while maintaining continuous contact between the telecoil 1014 and the audio signal source.

In operation, as shown in FIG. 34, a user can physically reorient the telecoil to the optimal orientation, which, of course, is the orientation that best matches the orientation of the telecoil contained in the user's hearing aid. With manual orientation of the telecoil this would be an iterative process by the device's user. Thus, another exemplary method 1100 for optimizing the orientation of the inductive field of a hearing aid compatible device includes the following steps: 1102 unlocking a locking device on a rotatable ball containing a transmitting telecoil; 1104 rotating the ball to a different position; 1106 attempting to couple the inductive field of the transmitting telecoil into a hearing aid; 1108 determining if the new position produces optimal coupling; if coupling is not optimal, repeating said steps of 1104 rotating the ball to a different position, 1106 attempting to couple the inductive field into a hearing aid, and 1108 determining if the new position produces optimal coupling; and, if coupling is optimal, 1110 relocking the locking device on the rotatable ball, in order to maintain the optimal orientation of the telecoil and its corresponding inductive field.

C. Conclusion

Thus, the invention provides a system and method for optimizing the strength of the inductive field of a hearing aid compatible device, and a system and method for optimizing the orientation of the inductive field of such a device, among other benefits and features.

One of ordinary skill in the art will recognize that additional configurations are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

What is claimed is:

1. A system for optimizing the orientation of the inductive field of a hearing aid compatible device, said system comprising:
   a substantially spherical element including, embedded therein, an inductive field producing telecoil operatively connected to an audio signal source; and
   a semi-spherical enclosure, said substantially spherical element being received partially in said semi-spherical enclosure and being rotatable with respect to said semi-spherical enclosure so as to vary coupling between said telecoil and a hearing aid to thereby enable optimizing of the orientation of the inductive field of the telecoil.

2. The system of claim 1, wherein said substantially spherical element is a ball.

3. The system of claim 2, further comprising a retaining ring, said retaining ring engaging said semi-spherical enclosure to prevent said ball from falling from said semi-spherical enclosure.

4. The system of claim 3, wherein said retaining ring has an edge and at least one tab positioned on said edge, wherein said semi-spherical enclosure has at least one slot for receiving said at least one retaining ring tab, said retaining ring engaging said semi-spherical enclosure by placing said retaining ring in said semi-spherical enclosure and rotating said ring.

5. The system of claim 2, further having flexible leads extending between said telecoil and said audio signal source.

6. The system of claim 5, wherein said ball further has tabs positioned to prevent rotation of the ball to less than 180 degrees.

7. The system of claim 2, wherein said ball further has a pair of slide contacts connected to said telecoil, wherein said semi-spherical enclosure has a pair of movable contact strips and a pair of stationary contact strips, said movable contact strips being in contact with said slide contacts, said stationary contact strips being in contact with said movable contact strips, and said stationary contact strips being in communication with said audio signal source, such that said ball may rotate with respect to said semi-spherical enclosure while maintaining continuous contact between said telecoil and said audio signal source.

8. The system of claim 1 further having a locking device to allow said substantially spherical element to be secured in a fixed position.

9. A method providing optimized orientation of the inductive field of a hearing aid compatible device relative to a hearing aid, said method comprising the steps of:
   (i) orienting a rotatable ball containing a transmitting telecoil in a selected orientation;
   (ii) coupling the inductive field of said transmitting telecoil to a hearing aid;
   (iii) determining if the orientation of the rotatable ball produces optimal coupling between said telecoil and said hearing aid; and
   (iv) if the coupling produced is not optimal, repeating step (i) to provide a new orientation and repeating steps (ii) and (iii).

10. The method of claim 9, further including:
   unlocking a locking device on said rotatable ball prior to step (i); and
   when coupling is optimal, relocking the locking device on said rotatable ball in order to maintain the optimal orientation of the telecoil and its corresponding inductive field.

* * * * *